United States Patent
Alnajjar et al.

(10) Patent No.: US 11,947,362 B1
(45) Date of Patent: Apr. 2, 2024

(54) TRANSFORMABLE SWARM ROBOTS FOR PIPE INSPECTION AND MAINTENANCE

(71) Applicant: UNITED ARAB EMIRATES UNIVERSTIY, Al Ain (AE)

(72) Inventors: Fady Alnajjar, Al Ain (AE); Amged Elhassan, Al Ain (AE); Waleed Khalil Ahmed, Al Ain (AE); Muthanna Ahmed Aziz, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 18/228,353

(22) Filed: Jul. 31, 2023

(51) Int. Cl.
| | |
|---|---|
| *B25J 19/02* | (2006.01) |
| *F16B 1/02* | (2006.01) |
| *F16L 55/1645* | (2006.01) |
| *F16L 55/32* | (2006.01) |
| *G05D 1/00* | (2006.01) |

(52) U.S. Cl.
CPC ............ *G05D 1/0295* (2013.01); *F16B 1/02* (2013.01); *F16L 55/1645* (2013.01); *F16L 55/32* (2013.01); *F16B 2200/83* (2023.08)

(58) Field of Classification Search
CPC .......... B25J 13/088; B25J 19/02; B25J 9/102; B25J 9/1666; B25J 9/1679; F16L 2101/12; F16L 2101/30
See application file for complete search history.

(56) References Cited

U.S. PATENT DOCUMENTS

| | | | |
|---|---|---|---|
| 5,172,639 A | 12/1992 | Wiesman et al. | |
| 5,220,869 A | 6/1993 | Pelrine et al. | |
| 6,084,402 A | 7/2000 | Smart | |
| 7,137,465 B1 | 11/2006 | Kerrebrock et al. | |
| 8,571,711 B2 * | 10/2013 | Jacobsen ............... | B62D 63/00 180/9.26 |
| 9,383,055 B2 | 7/2016 | Hirose et al. | |
| 10,545,121 B2 | 1/2020 | Frueh et al. | |
| 11,118,719 B1 * | 9/2021 | Moreau ................. | B62D 63/02 |
| 11,629,807 B1 * | 4/2023 | Ehle ..................... | G01M 3/005 73/865.8 |
| 2004/0099175 A1 | 5/2004 | Perrot et al. | |
| 2018/0313715 A1 * | 11/2018 | Cichosz ................ | G01N 29/12 |
| 2021/0148503 A1 | 5/2021 | Fekrmandi et al. | |
| 2023/0222454 A1 * | 7/2023 | Cella .................... | G06Q 10/087 705/28 |

* cited by examiner

*Primary Examiner* — Dalena Tran
(74) *Attorney, Agent, or Firm* — Nath, Goldberg & Meyer; Richard C. Litman

(57) ABSTRACT

The Transformable Swarm Robots for Pipe Inspection and Maintenance (TSRPIM) represent a comprehensive system that include a single or multiple robots, each featuring distinct functionalities and designs, that can work independently or collaboratively to accomplish the primary objective of inspecting and maintaining different pipeline systems. The robots in TSRPIM can be physically connected/disconnected with/from other robots through an electromagnetic locking mechanism. They can bypass each other inside the pipe through overriding techniques, and they can communicate through WIFI, Bluetooth, and Long-range RF communication, thus the system has intranet and internet communications.

11 Claims, 21 Drawing Sheets

TRANSFORMABLE SWARM ROBOTS FOR PIPE INSPECTION AND MAINTENANCE

BACKGROUND

1. Field

The present disclosure relates to the inspection and maintenance of underground pipe systems, and particularly to a system and method for inspection of underground pipe systems such as sewers, storm water pipes, water distribution pipes, gas pipes, oil and chemical pipelines, HVAC ducts, industrial process pipes, and the like.

2. Description of the Related Art

The inspection and maintenance of underground pipe systems, including sewer and storm water pipes, water distribution pipes, gas pipes, oil and chemical pipelines, HVAC ducts, and industrial process pipes, are crucial concerns that have yet to be addressed with groundbreaking solutions. There is a lack of radical or revolutionary approaches to tackle these challenges effectively. These underground pipe systems play a vital role in various sectors, such as sanitation, water supply, energy distribution, and industrial operations. Regular inspections and maintenance are necessary to ensure proper functioning, prevent failures, and mitigate risks associated with leaks, blockages, corrosion, or structural deterioration. Despite the importance of these activities, there is a prevailing gap in finding innovative solutions that can significantly improve the efficiency, accuracy, and cost-effectiveness of inspections and maintenance. Traditional methods, such as visual inspections, physical probes, or periodic cleaning, have limitations in detecting hidden issues, providing real-time monitoring, or minimizing disruption to services.

Addressing the challenges of traditional methods requires a multifaceted approach that combines advanced technologies, data analytics, and predictive maintenance strategies. Innovations like remote sensing, robotic inspections, intelligent monitoring systems, and predictive analytics hold promise but are still in the early stages of development or implementation.

The absence of radical solutions signifies the need for further research, development, and collaboration among industry stakeholders, government agencies, and academia. A concerted effort is necessary to bridge the gap between existing practices and the desired transformative solutions to enhance underground pipe system inspections and maintenance.

The inspections of underground pipe systems are of utmost importance to preserve the integrity of distribution networks, prevent material loss, avoid environmental harm, and uphold infrastructure safety standards. However, traditional methods used for pipe inspection are often labor-intensive, expensive, and come with inherent risks for human workers. Regular inspections can identify potential issues such as leaks, cracks, blockages, or corrosion early on. This proactive approach helps maintain the structural integrity of the pipes, preventing catastrophic failures that could result in service disruptions, contamination of water supplies, or release of hazardous substances. Unfortunately, traditional pipe inspection methods typically involve manual labor, requiring workers to access the underground pipes physically. This process can be time-consuming, costly, and pose various risks to the health and safety of the workers involved. Challenges such as confined spaces, exposure to harmful gases or substances, and the potential for accidents or injuries are prevalent in these inspection procedures.

There is a growing need for alternative inspection techniques that minimize or eliminate human intervention in hazardous environments to address these concerns.

SUMMARY

Emerging technologies such as robotic inspections, remote sensing, and unmanned aerial vehicles (UAVs) offer promising solutions for conducting pipe inspection. These emerging systems and methods enable the examination of pipes without human entry, reducing worker risks and increasing overall efficiency and safety. This can improve the reliability, safety, and longevity of these essential infrastructure networks.

Implementing these advanced inspection approaches can significantly improve cost-effectiveness, accuracy, and worker safety. It allows for more frequent and comprehensive inspections, ensuring the early detection of potential issues and enabling prompt maintenance actions to be taken. By adopting these innovative methods, the integrity of underground pipe systems can be better preserved, minimizing material loss, preventing environmental damage, and enhancing overall infrastructure safety. With the continual advancements in technology, robotics has emerged as a groundbreaking solution to transform the field of pipe inspections. Specifically, in the case of sewer and storm water pipes, robots offer an innovative approach to detect blockages, assess structural damage, and identify infiltration and inflow problems.

Robotic technology presents a viable option for inspecting water distribution pipes to ensure the safety and efficiency of the drinking water system. By employing robots, it becomes possible to thoroughly examine water distribution pipes for leaks, corrosion, and other types of damage. This proactive approach helps maintain the integrity of the water distribution system, ensuring the delivery of safe and reliable drinking water to consumers.

Accordingly, the system disclosed herein represents a groundbreaking method for inspecting intricate pipe structures by employing an innovative Transformable Swarm Robot (TSR) concept. This exceptional solution harnesses the power of artificial intelligence (AI) technology to serve two primary objectives: 1) effectively managing inspection tasks through a fleet of coordinated swarm robots, and 2) implementing an intelligent system capable of identifying pipe damage and providing actionable recommendations based on a comprehensive database of previously executed actions. Through the integration of AI technology, the system disclosed herein enables swift and accurate detection of pipe damage, ensuring prompt intervention and precise remediation plans.

The present subject matter utilizes a fleet of swarm robots to optimize the inspection process by examining multiple pipe network segments, covering a larger area within a shorter timeframe. The AI component of the system plays a pivotal role in analyzing the vast amount of collected data, identifying patterns, and leveraging historical insights stored in the database. This enables the system to generate valuable recommendations for appropriate actions based on successful past interventions. Consequently, this solution not only facilitates the timely detection of pipe damage but also aids in the development of effective remediation plans, minimizing potential disruptions and enhancing the overall operational efficiency of the pipe infrastructure.

The present systems and methods offer a paradigm shift in complex pipe structure inspection, utilizing Transformable Swarm Robots and AI technology to achieve swift and precise pipe damage detection, while providing actionable recommendations for effective remediation planning.

Accordingly, the present subject matter relates to a pipe inspection swarm robot system which includes, in one embodiment, one or more swarm robots. Each of the one or more swarm robots includes:
- a main control and monitoring unit managing and controlling operations of the swarm robot;
- robot actuators and an actuator drive module providing required power to drive the robot actuators;
- a geared DC motor connected to wheels allowing the swarm robot to move in any direction and turn up to 360 degrees;
- an electromagnet locking mechanism allowing for physical connection to another swarm robot;
- obstacle avoidance sensors;
- a navigation system;
- a power supply and management module; and
- a function module allowing each of the one of the one or more swarm robots to perform a specified task.

The function module can be portable and can be detachable from the robot.

The function module can be one of a processing function, a network communication function, a power station function, a visual inspection function, an imaging function, and a 3D printing function.

The process function can include artificial intelligence (AI) and machine learning (ML) applications.

The imaging function can include ground penetrating radar generating detailed images of underground structures.

The function module can be customizable to perform a user defined function.

The swarm robots can be attachable to each other via the electromagnet locking mechanism.

The swarm robots can be detachable and attachable during use via the electromagnetic locking mechanism.

In another embodiment, the present subject matter relates to a method for pipe inspection using a swarm robot system having one or more swarm robots, each of the one or more swarm robots having: a main control and monitoring unit managing and controlling operations of the swarm robot; robot actuators and an actuator drive module providing required power to drive the robot actuators; a geared DC motor connected to wheels allowing the swarm robot to move in any direction and turn up to 360 degrees; an electromagnet locking mechanism allowing for physical connection to another swarm robot; obstacle avoidance sensors; a navigation system; a power supply and management module; and a function module allowing each of the one of the one or more swarm robots to perform a specified task. The method can include:
- receiving data from external sensors through a visual inspection module of the one or more swarm robots;
- processing data received from the external sensors using artificial intelligence (AI) and machine learning (ML) applications through a processing module of the one or more swarm robots; and
- relaying the processed data to a user through at least one of the one or more swarm robots.

The method can further include supplying power to the one or more swarm robots through a power station module of at least one of the one or more swarm robots.

The method can also include generating detailed images of underground structures through an imaging module of at least one of the one or more swarm robots.

The method can also include fabricating a component to seal leaks through a 3D printing device using a 3D printing module of at least one of the one or more swarm robots.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
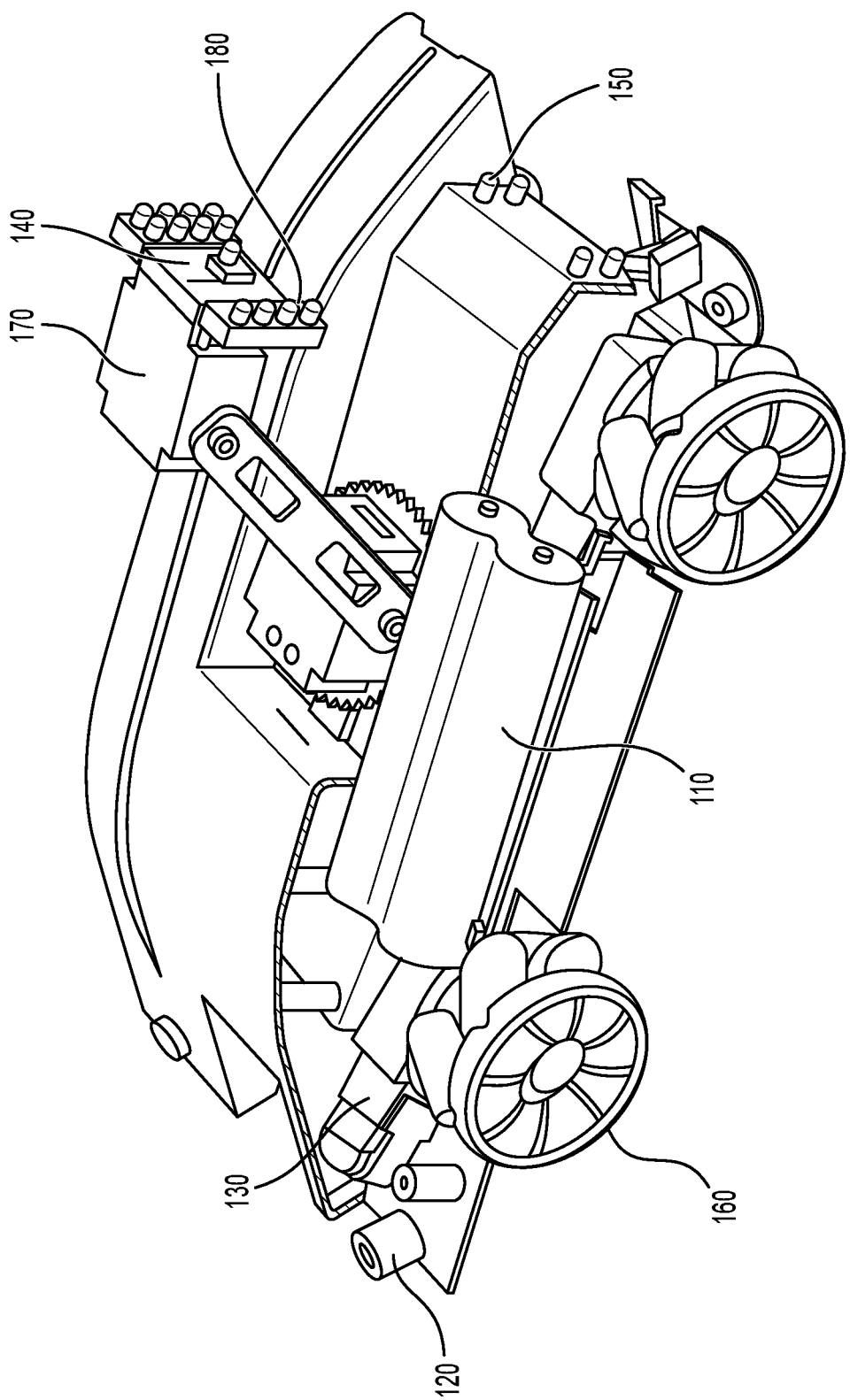
FIG. 1 is an illustration of the swarm robot base internal/external design.

The following definitions are provided for the purpose of understanding the present subject matter and for construing the appended patent claims.

Definitions

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

Pipeline frameworks are dominantly used to move water, oil, gas, etc. Consumption, breaks, spillages, and mechanical harm from outsiders bring about most deformities in pipes. It is important to identify these deformities in the channel's inward mass. Planned assessments are completed to discover the deformities inside the channel. Although these planned assessments keep pipelines in excellent condition, such administrative costs are costly and escalate the high number of man hours needed. The procedure turns out to be all the more difficult especially in physically risky situations like oil, and gas ventures. Robots are utilized to reduce the amount of human exposure in dangerous workplaces. Robots have all the earmarks of being the best answer for mirroring human tasks to identify the deformities in pipeline frameworks. Visual assessment frameworks can be utilized in pipes to improve enterprises' proficiency and security. Robots can be used to investigate the inside of pipelines quickly and determine outcomes more precisely, requiring little to no effort. Pipeline robots can be utilized in different applications, for example, (i) long-length pipelines, (ii) visual assessment of the interior surfaces of the seawater channeling at atomic force plants (iii) lessening the hazard in the synthetic business during transport, assembling, and capacity of synthetic substances and (iv) food and drink industry for checking the cleanliness of the food and beverages.

The system disclosed herein is an innovative, customizable, and sustainable pipe inspection and maintenance system that can be used on pipeline systems of varying geometries, complexities, and environmental conditions. The designed system demonstrates an innovative approach that overcomes the limitations of existing technologies in terms of cost, operation time, and system complexity. In addition, the platform consists of autonomous, individual modules that can be operated independently or integrated with other modules to accomplish expansive missions.

Transformable Swarm Robots for Pipe Inspection and Maintenance (TSRPIM) is a modular, comprehensive system that includes multiple robots that operate independently or collaboratively to achieve the primary objective of inspecting and maintaining pipeline systems. The system can assess the condition of internal pipeline surfaces, including local damage inspection, corrosion detection, crack identification, and environmental monitoring. It can efficiently operate in potentially hazardous underground environments or confined spaces, access difficult-to-reach areas, and navigate complex piping networks, significantly reducing labor and operational costs.

The system can facilitate inspection management within intricate piping structures with numerous bends, restricted accessibility, and extensive distances. It can additionally enhance inspection area coverage in less time by utilizing swarm search techniques to optimize the process.

Through an electromagnetic locking mechanism, the robots in TSRPIM can be physically connected/disconnected from other robots. Robots can be attached and detached from either side (front or back). Using overriding techniques, they can bypass each other inside the pipe and communicate via WIFI, Bluetooth, and long-range RF communication, giving it intranet and internet capabilities.

The TSRPIM uses artificial intelligence to develop an autonomous and learnable robotic system capable of making independent, logical decisions based on acquired experiences, and it promotes the distribution of functionality and the decentralization of intelligence within the system.

Robot Design

All robots share the same base design, while add-on, portable modules determine each robot's functionality. This enables the migration capability, allowing robots to exchange or introduce new functions as required.

Figure 2:
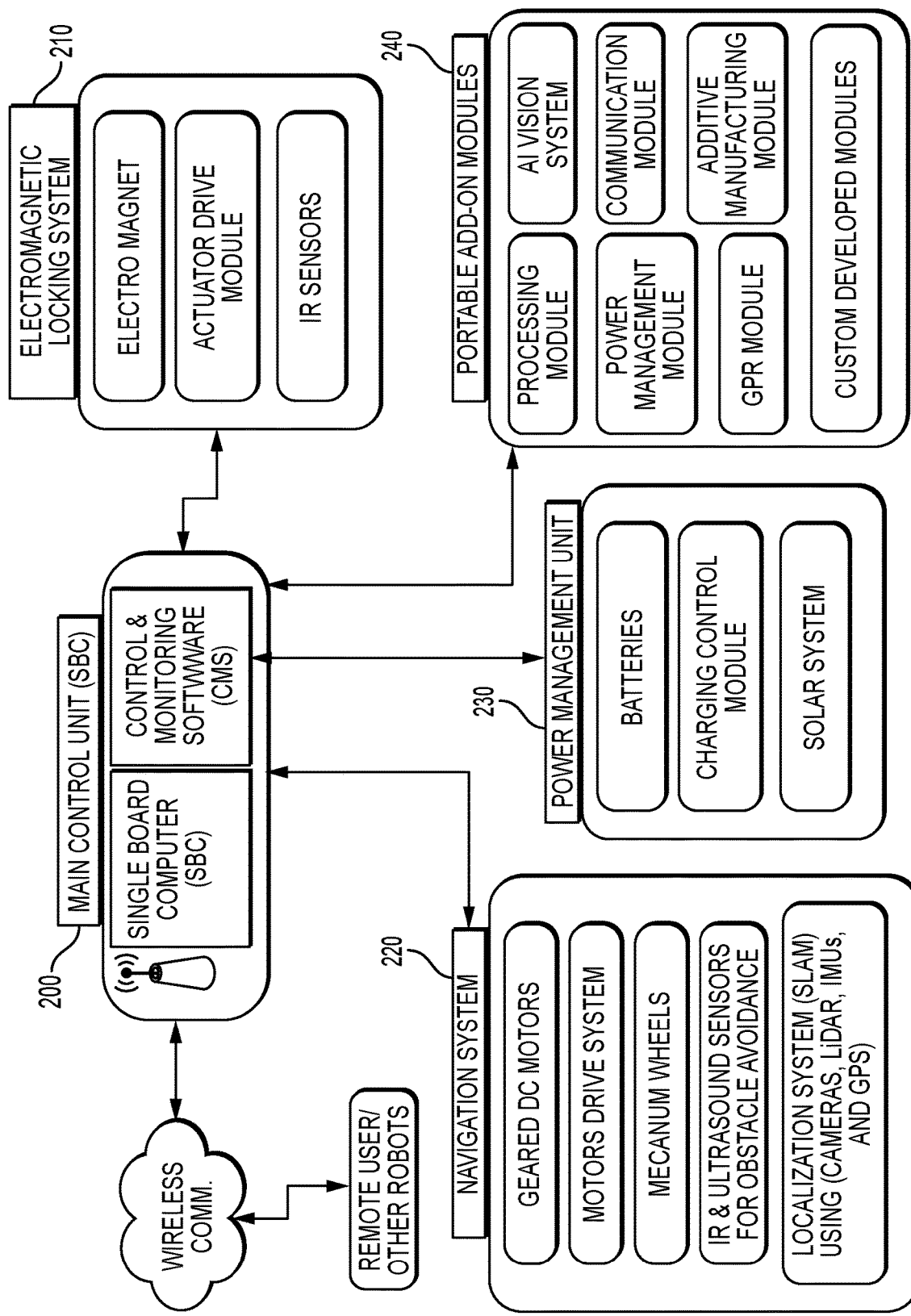
FIG. 2 is an illustration of components in the swarm robot base.

FIG. 1 is an illustration of the robot base internal/external design. In this non-limiting embodiment, it includes the following:
- 110 Battery 110: 4.7V 2 cells,
- 120 Electromagnets 120: 0.5 inches, 2 lb. holding power,
- 130 Motors 130: TT Geared Motors 5V,
- 140 Camera 140: Raspberry Pi Camera,
- 150 IR Sensors 150,
- 160 Wheels 160: Mecanum Wheels.
- 170 Robotic Arm Motors 170: SG90 Servo Motors.
- 180. LEDs: Super Bright White, through hole LEDs As shown in the non-limiting embodiment of FIG. 2, the robot base includes the following components:

Main Control Unit 200: An embedded single-board computer (SBC) is responsible for managing all robot operations by receiving and analyzing information from various sensors and taking decisions translated into commands for robot actuators (geared motors, electromagnets, etc.) through Control & Monitoring Software (CMS). Also, it handles and controls the portable add-on modules. This unit communicates with other robots using Wireless communication such as (RF, Wi-Fi, BLE)

Actuator Drive Module of the Electromagnetic Locking System 210: Provides the required power to drive the robot actuators and acts as a bridge between the main control unit and the actuators.

Geared DC Motors of the Navigation System 220 is connected to Mecanum Wheels of the Navigation System (these wheel allow the robot to move in any direction and turn up to 360 degrees by varying the direction and speed of each wheel). Moving all four wheels in the same direction causes forward/backward movement, running left/right sides in opposite directions causes rotation, and running front and rear in opposite directions causes sideways movement.

Electromagnets of the Electromagnetic Locking System 210 are used as a locking mechanism that physically connects two robots together.

IR and Ultrasound Sensors of the Navigation System 220 are used for obstacle avoidance; an IR sensor is also used to indicate a successful attachment of two robots.

Navigation System 120: Robots in TSRPIM use SLAM algorithms (Simultaneous Localization and Mapping), which combine sensor data from multiple sources (e.g., cameras, LiDAR, IMUs, and GPS) to simultaneously estimate the robot's position and create a map of the pipe's interior.

Power Management Unit 230: Consists of batteries and a charging control module as well as voltage regulators and DC-DC converters to provide the required voltages for various electrical components. Also, it gives the ability to recharge robot batteries wirelessly or with water energy when needed. A solar system is also included as a power source.

Robot Types

Each robot features a distinct role, and functionalities based on Portable Add-On Modules 140. There are six standard modules/robot types:

1. Processing Module (the Brain): Shares the same standard robot specifications as other robots, with the exception of having higher processing capabilities to handle complex artificial intelligence (AI) and machine learning (ML) applications. The robot is used to train new data when needed. It has a single-board computer with high processing capabilities dedicated to AI and ML applications, such as the Jetson Nano, a compact single-board computer developed by NVIDIA for artificial intelligence (AI) and machine learning (ML) applications.

Figure 3A:
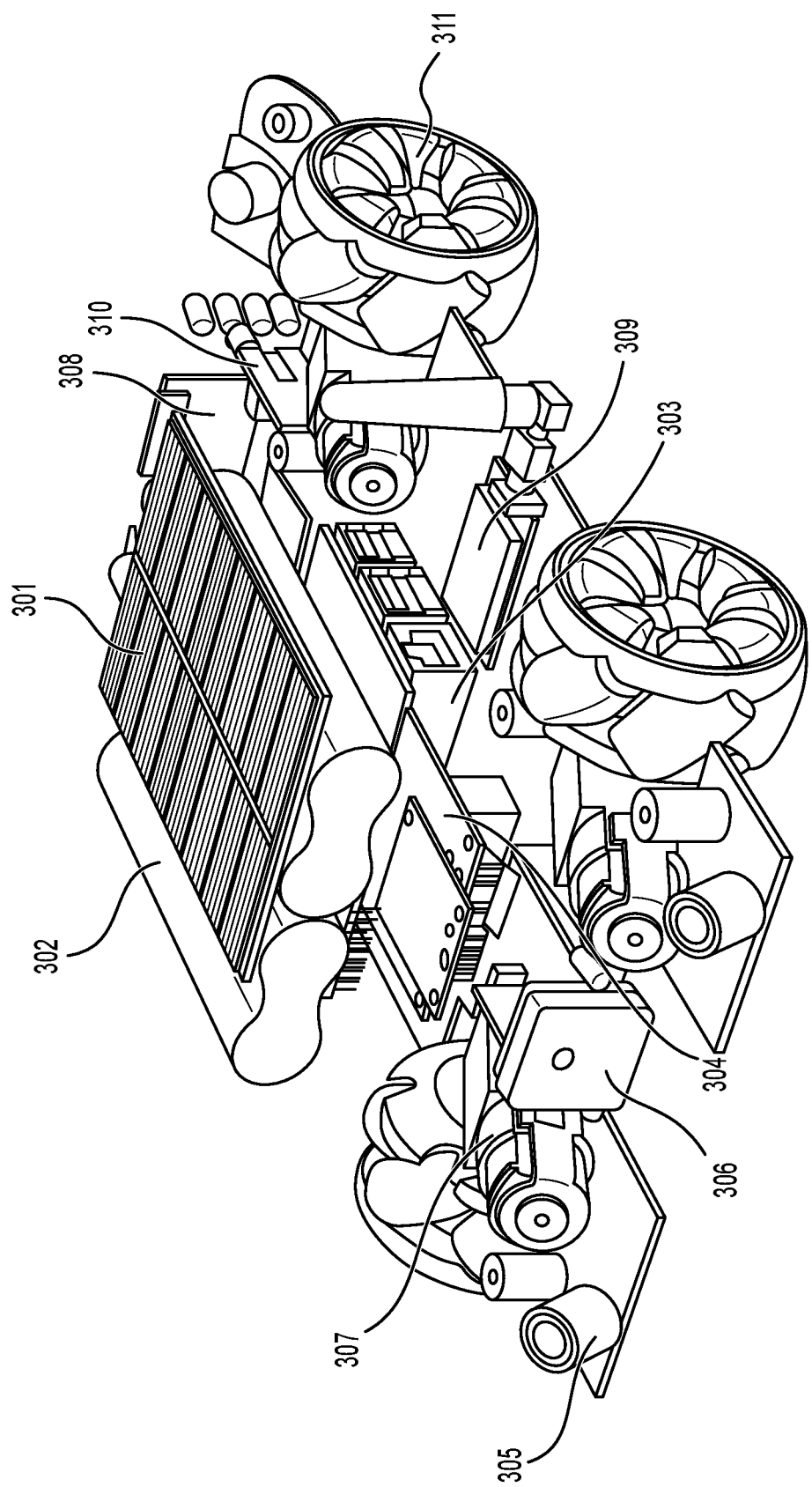
FIG. 3A is an illustration of the interior of a network communications swarm robot.
Figure 3B:
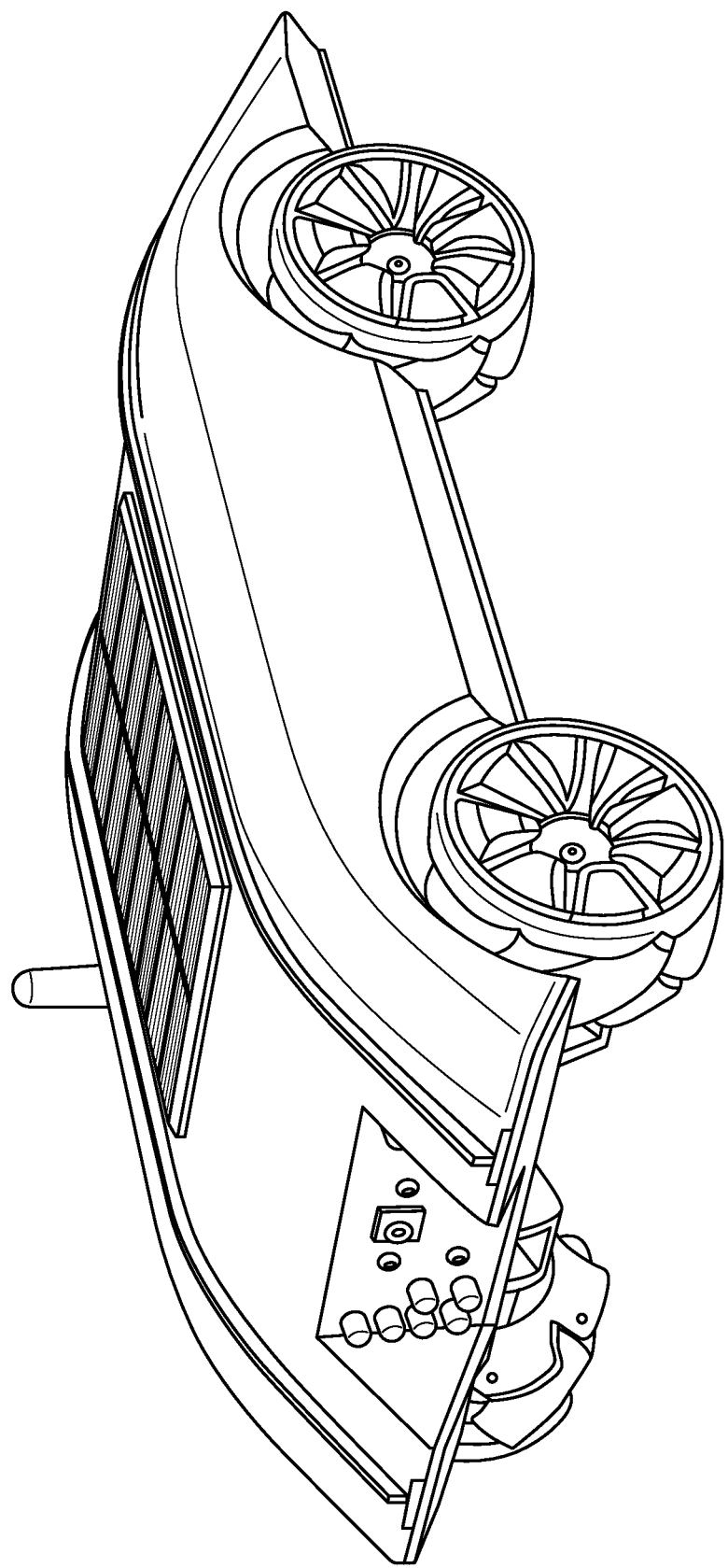
FIG. 3B is an illustration of the exterior of a network communication swarm robot.
Figure 4A:
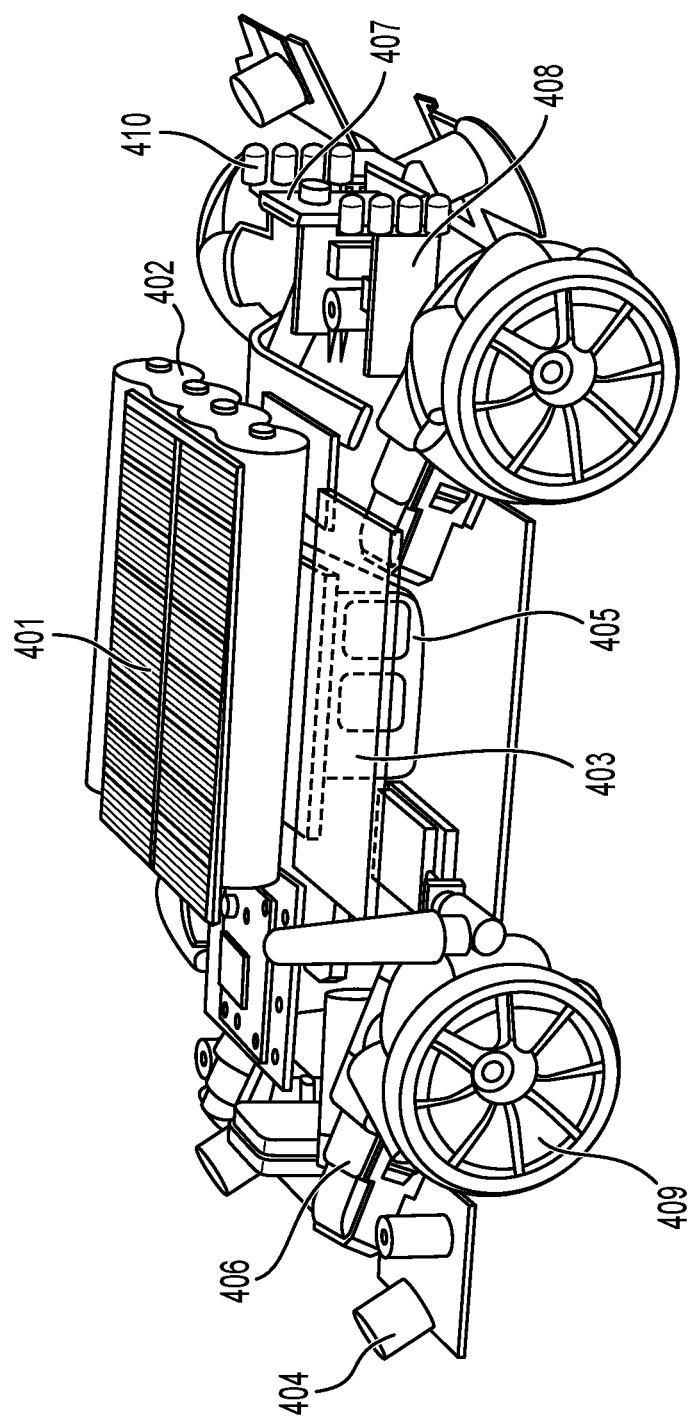
FIG. 4A is an illustration of the interior of a power station swarm robot.
Figure 4B:
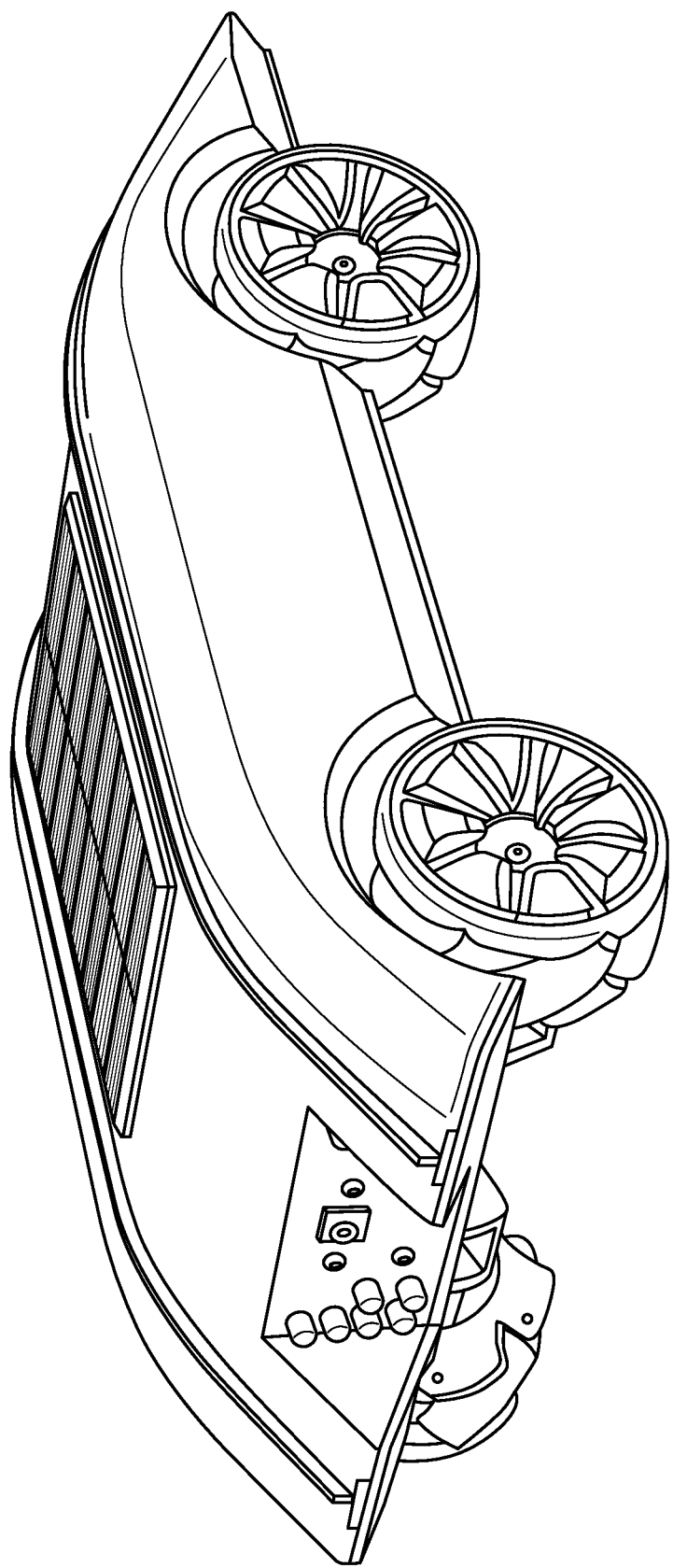
FIG. 4B is an illustration of the exterior of a power station swarm robot.

2. Communication Module performs various tasks related to network management, monitoring, and maintenance, and is mainly responsible for internet communication. These tasks include monitoring and optimizing network performance, configuring, and managing devices, troubleshooting network issues, detecting security threats, and maintaining up-to-date documentation. This robot has Network Interface Cards (NICs) to interface with different network segments or devices, enabling it to monitor and interact with the network. The robot also has Wireless communication modules (Wi-Fi, Bluetooth, and RF). However, any of the robots in TSRPIM can be a host/Hub for intranet communication. This network communication robot, as illustrated in FIGS. 3A (interior) and 3B (exterior), is mainly responsible for internet communication and includes the following components.
- 301 Solar Panel: 5V 200 mA 1 W with charge controller
- 302 Battery: 4.7V 3 cells
- 303 Raspberry Pi: Version 4 Model B
- 304 L298 Motor Driver: Motor Driver with PWM input
- 305 Electromagnets: 0.5 inches, 2 lb. holding power
- 306 GPS Module: UBlox Neo 6 m
- 307 Motors: TT Geared Motors 5V
- 308 Camera: Raspberry Pi Camera
- 309 Communication Module: LORA E32, 3 km range
- 310 IR Sensors: Obstacle AvoidanceInfrared Sensor
- 311 Wheels: Mecanum Wheels 3. Power Management Module, functioning as a power station for the other robots in the system. The robot exhibits limited mobility and reduced processing capabilities to regulate energy consumption. It is equipped with a more significant number of rechargeable batteries compared to its counterparts. The robot also has a regenerative motor or regenerative braking system. This system functions by converting the kinetic energy generated during deceleration or when moving downhill into electrical power, which is then used to recharge the robot's battery. FIGS. 4A (interior) and 4B (exterior) are illustrations of a power station robot, which includes the following components.
- 401 Solar Panel: 5V 200 mA 1 W with charge controller
- 402 Battery: 4.7V 3 cells
- 403 Raspberry Pi: Version 4 Model B
- 404 Electromagnets: 0.5 inches, 2 lb. holding power
- 405 Wireless Charger: Charging Receiver Adapter Module 5V 1A
- 406 Motors: TT Geared Motors 5V
- 407 Camera: Raspberry Pi Camera
- 408 The IR Sensors: Obstacle Avoidance Infrared Sensor
- 409 Wheels: Mecanum Wheels
- 410 LEDs: Super Bright White, through hole LEDs 4. AI Vision System (Eye-Robot for Visual Inspection), This robot is equipped with a high-definition AI camera with night vision, underwater capabilities, and advanced lighting systems to assess the overall condition, corrosion, cracks, and other anomalies. This robot has the ability to apply AI and Machine Learning (ML) algorithms locally on the acquired images using optimized algorithms for edge devices to identify any abnormalities and record the location of the problem on a pipeline map.

This robot also has an early Leak Detection system based on Acoustic sensors, which detects subtle changes in sound, indicating leaks in the pipes. This early detection helps to address leaks before they become significant problems. In addition, ultrasonic sensors for Pipe wall thickness measurement.

Figure 5:
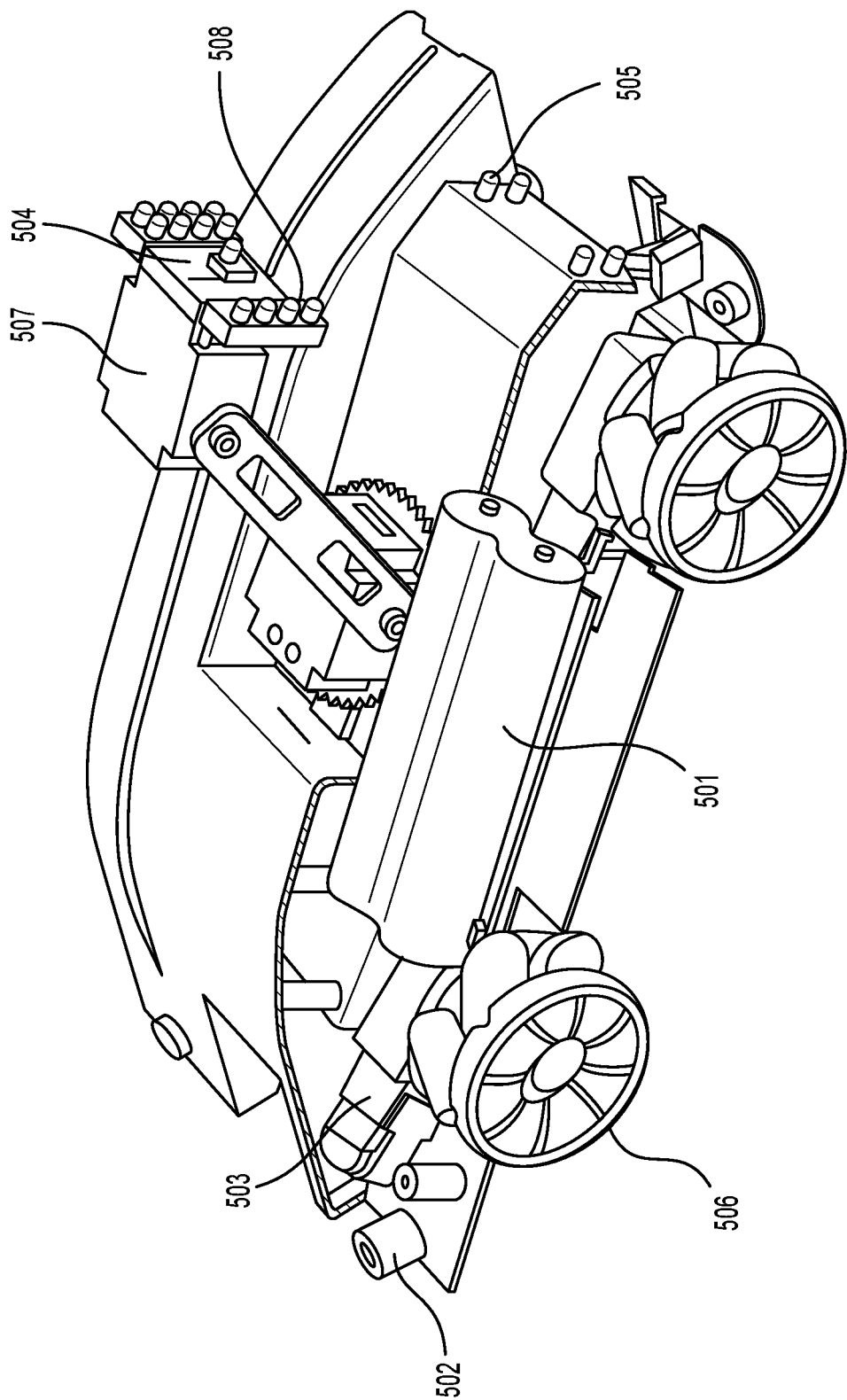
FIG. 5 is an illustration of an eye swarm robot for visual inspection.

An eye robot for visual inspection is illustrated in FIG. 5 and includes the following components.

501 Battery: 4.7V 2 cells
502 Electromagnets: 0.5 inches, 2 lb. holding power
503 Motors: TT Geared Motors 5V
504 Camera: Raspberry Pi Camera
505 The IR Sensors:
506 Wheels: Mecanum Wheels.
507 Robotic Arm Motors: SG90 Servo Motors.
508 LEDs: Super Bright White, through hole LEDs 5. Ground-penetrating radar (GPR) Module, GPR-equipped robots can generate detailed images of underground water pipes, including their depth, composition, and structural integrity. This non-destructive testing method is beneficial for inspecting large-diameter pipes and identifying potential issues without excavation. This robot will help build Maps of the general structures of the pipes and build a navigation plan for all the robot to cover a larger area in an organized manner.

6. Additive Manufacturing Module: This printing robot for maintenance can be regarded as a mobile 3D printing device. It possesses the capacity to fabricate diminutive adhesive components designed to seal minor leaks. Upon detecting the dimensions of the fissure, the robot will generate a repair piece tailored to the specific size of the crack and apply it directly to the affected area.

7. Custom Developed Modules: In addition to the six standard robot types described previously, the system could be equipped with any number of robots with custom functions (determined by the added portable module) and suited to specific applications, such as collecting and analyzing environmental samples, etc. Also, the system could consist of any combination of robots in large or small groups, or it could operate independently. Each robot is assigned a unique identifier, with the lowest ID being the leader.

Figure 6:
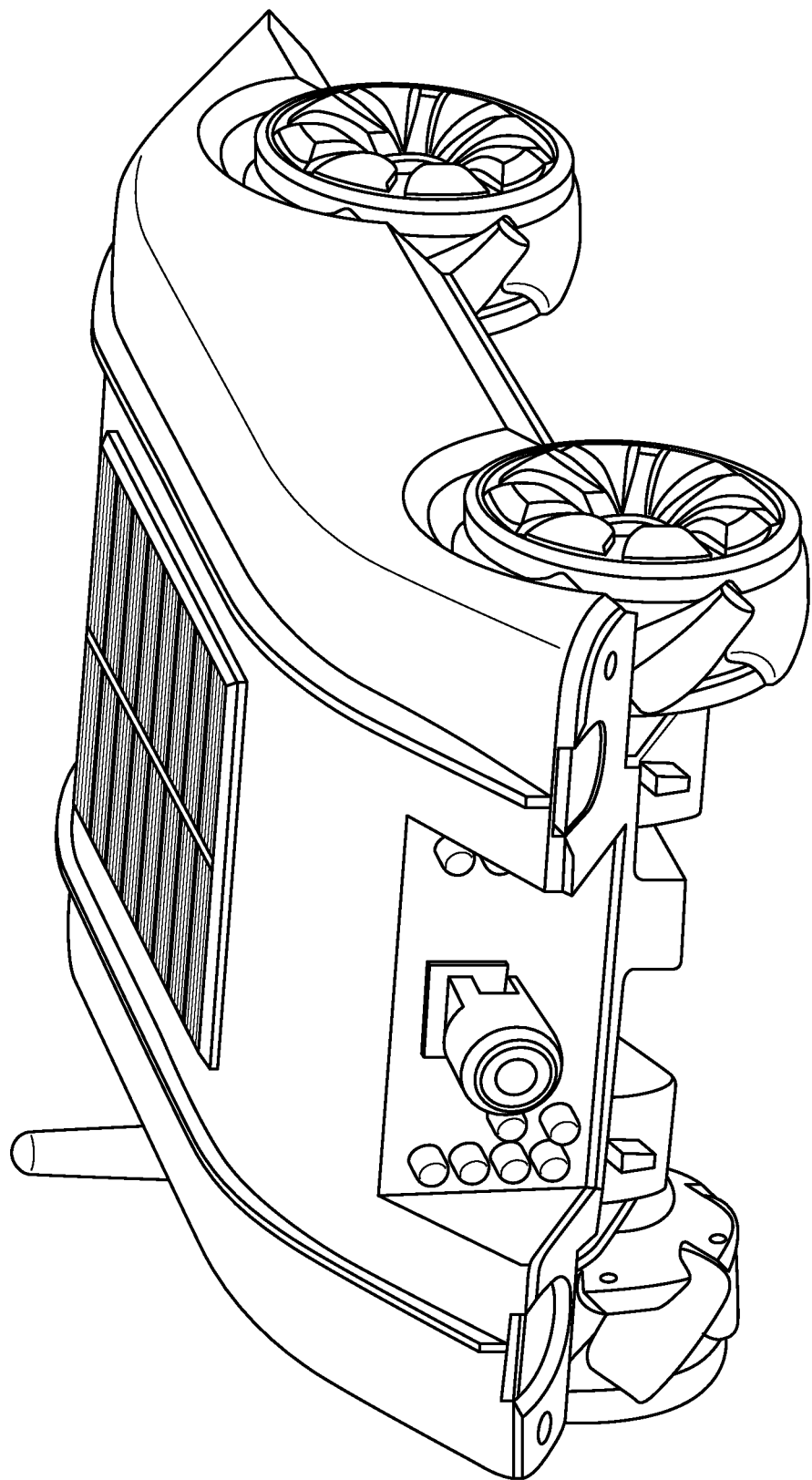
FIG. 6 is an illustration showing the dimensions of a swarm robot.
Figure 7:
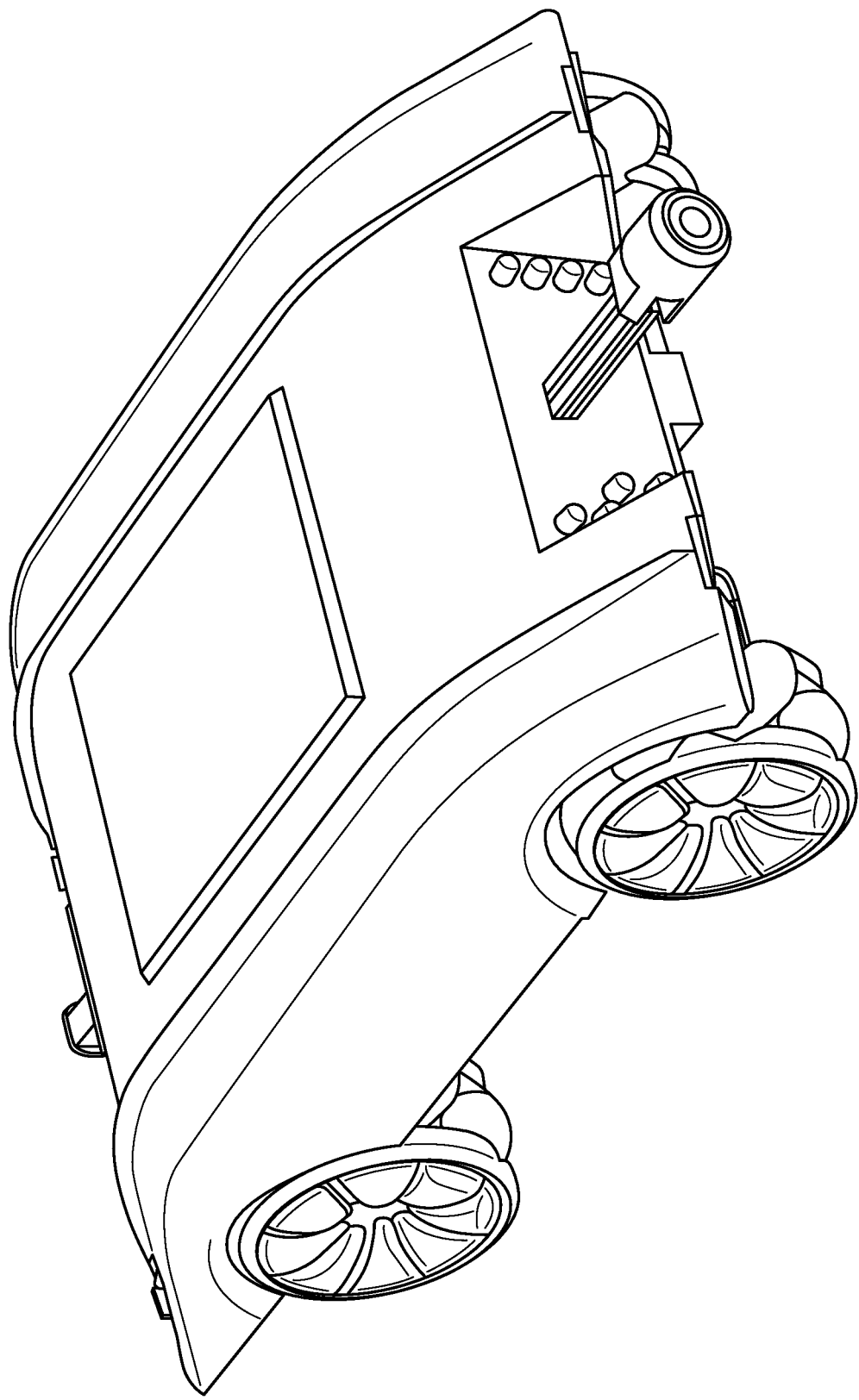
FIG. 7 is a swarm robot side view.
Figure 8:
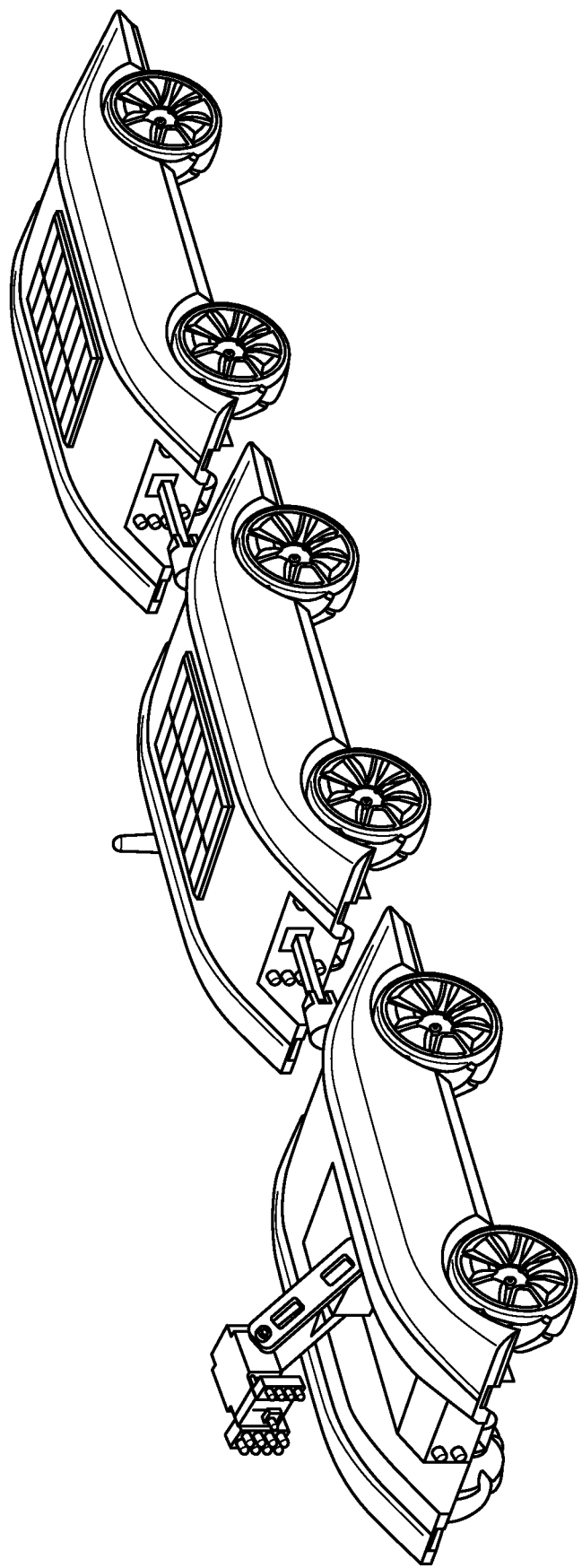
FIG. 8 is an illustration of three swarm robots attached to each other.
Figure 9:
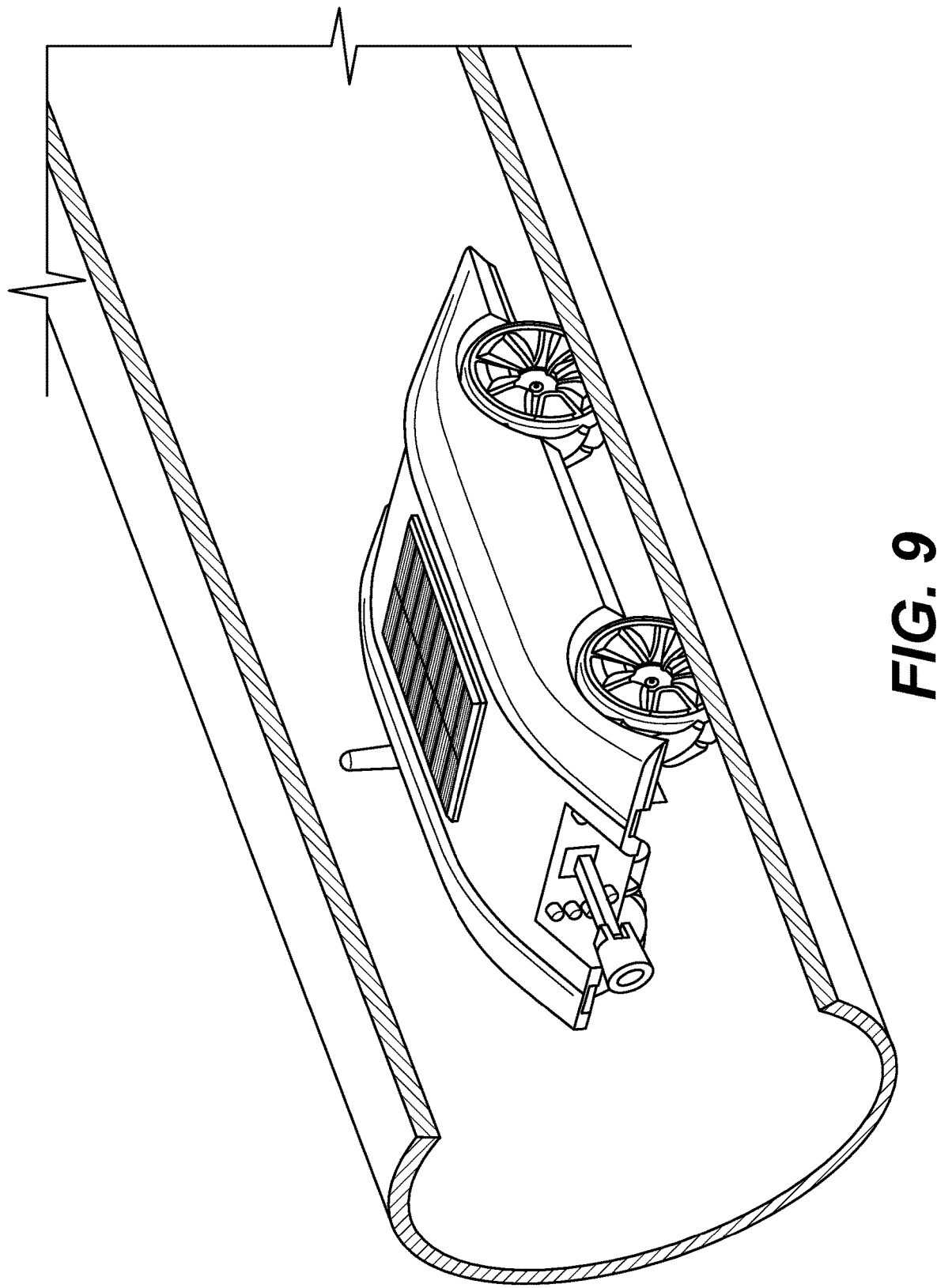
FIG. 9 is an illustration of a swarm robot inside an 8-inch pipe.
Figure 10:
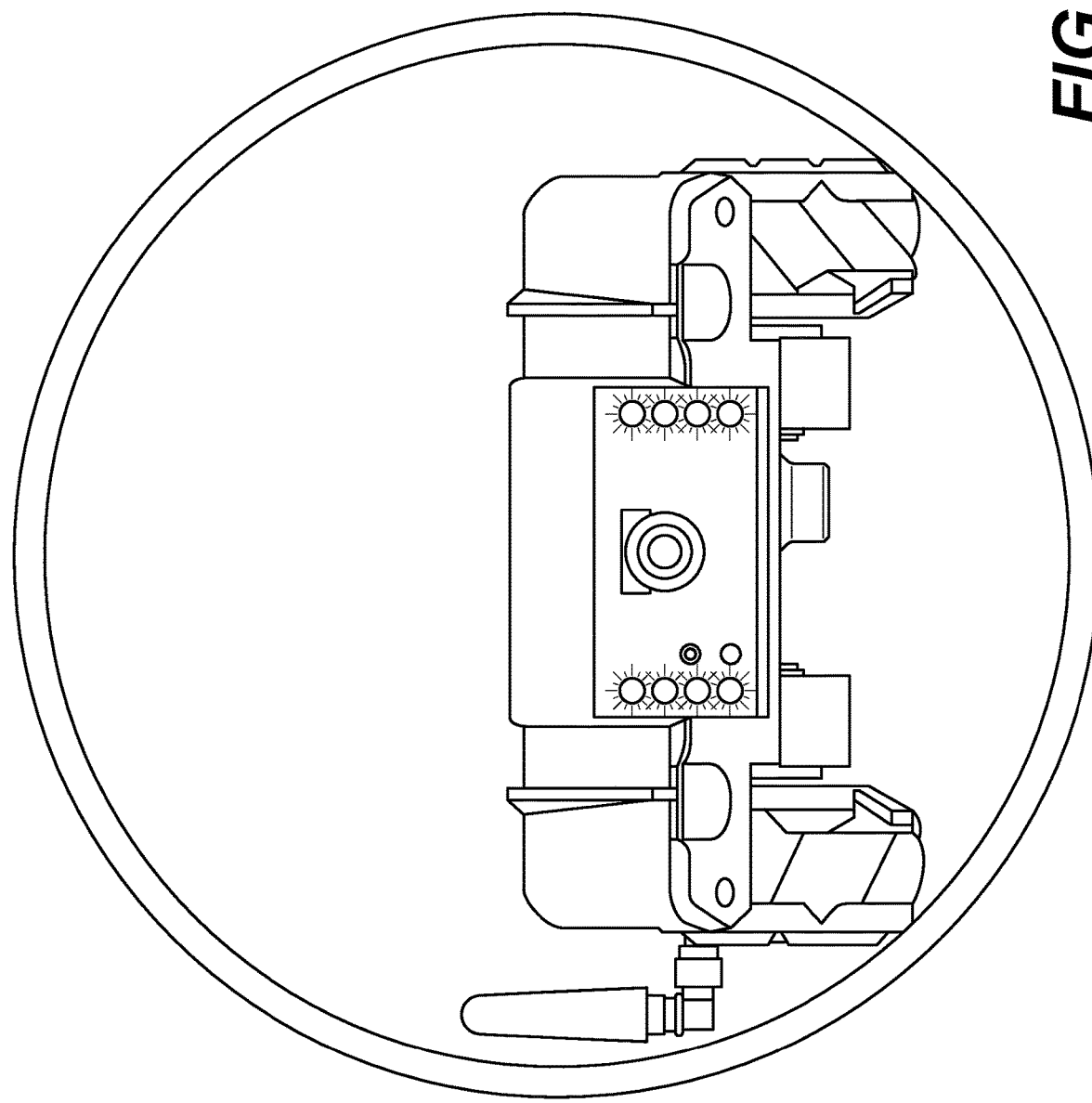
FIG. 10 is a cross sectional view of a swarm robot in an 8-inch pipe.
Figure 11:
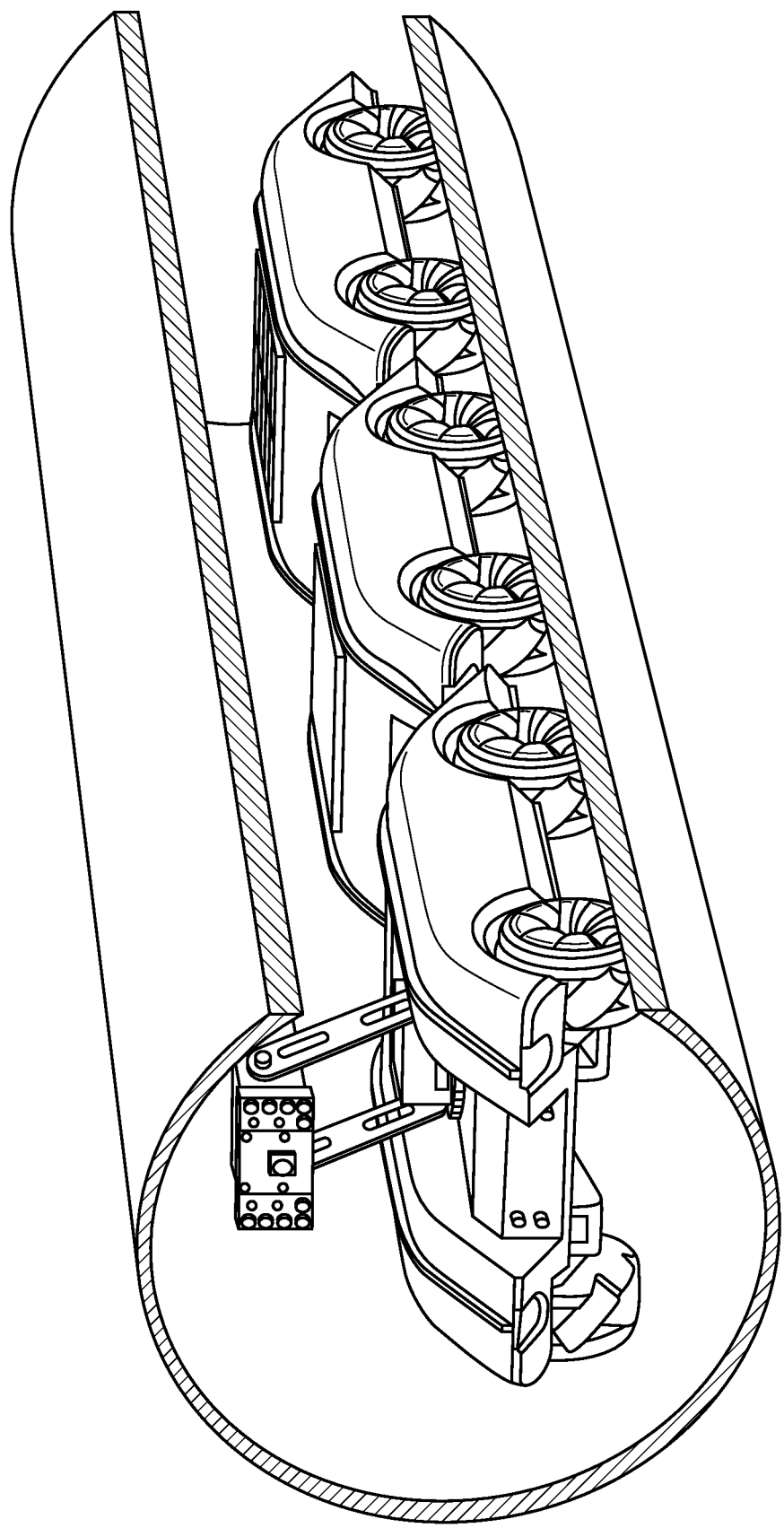
FIG. 11 is an illustration of a group of swarm robots inside an 8-inch pipe.
Figure 12:
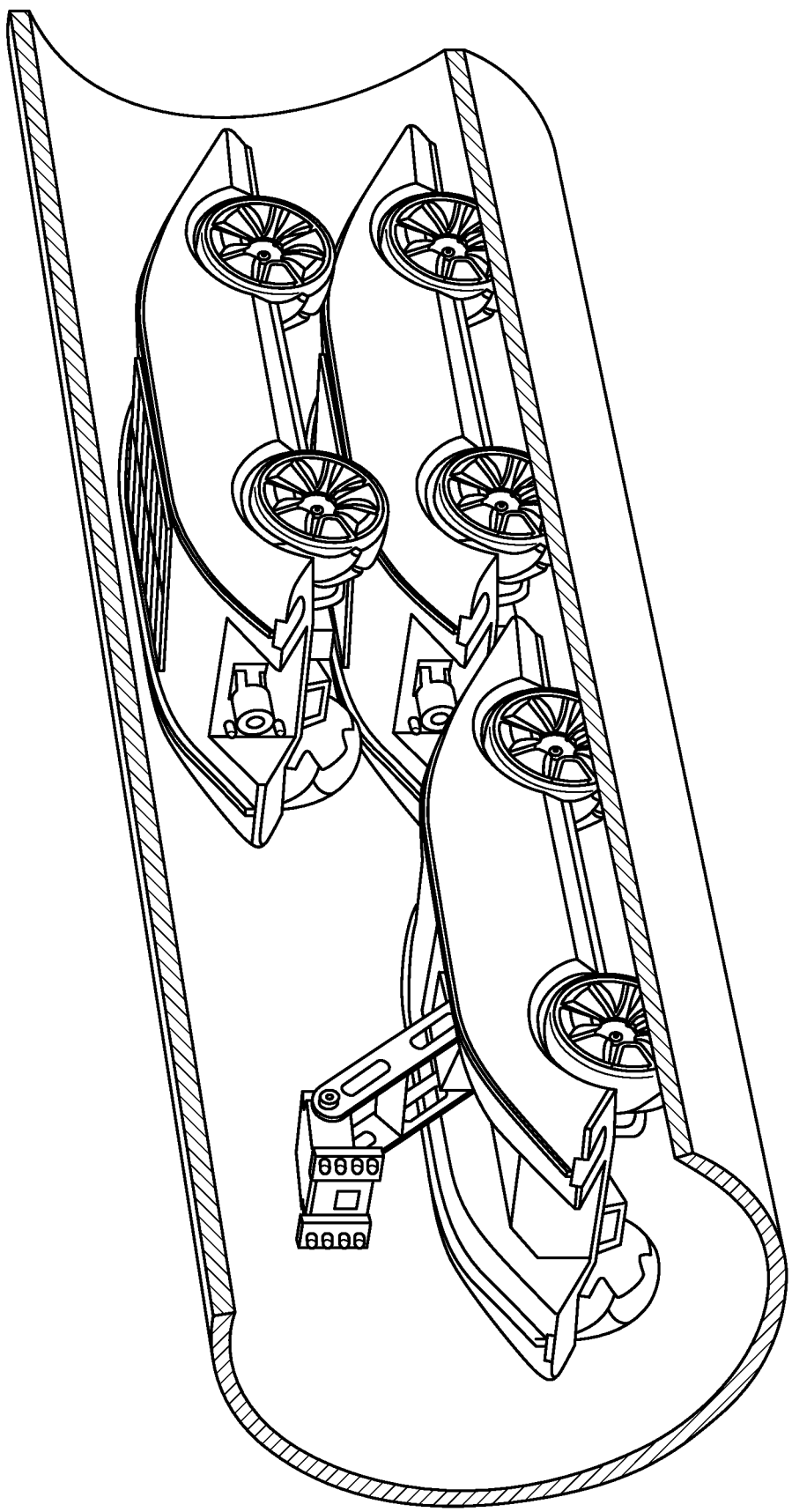
FIG. 12 is an illustration of swarm robots passing over each other inside an 8-inch pipe.
Figure 13:
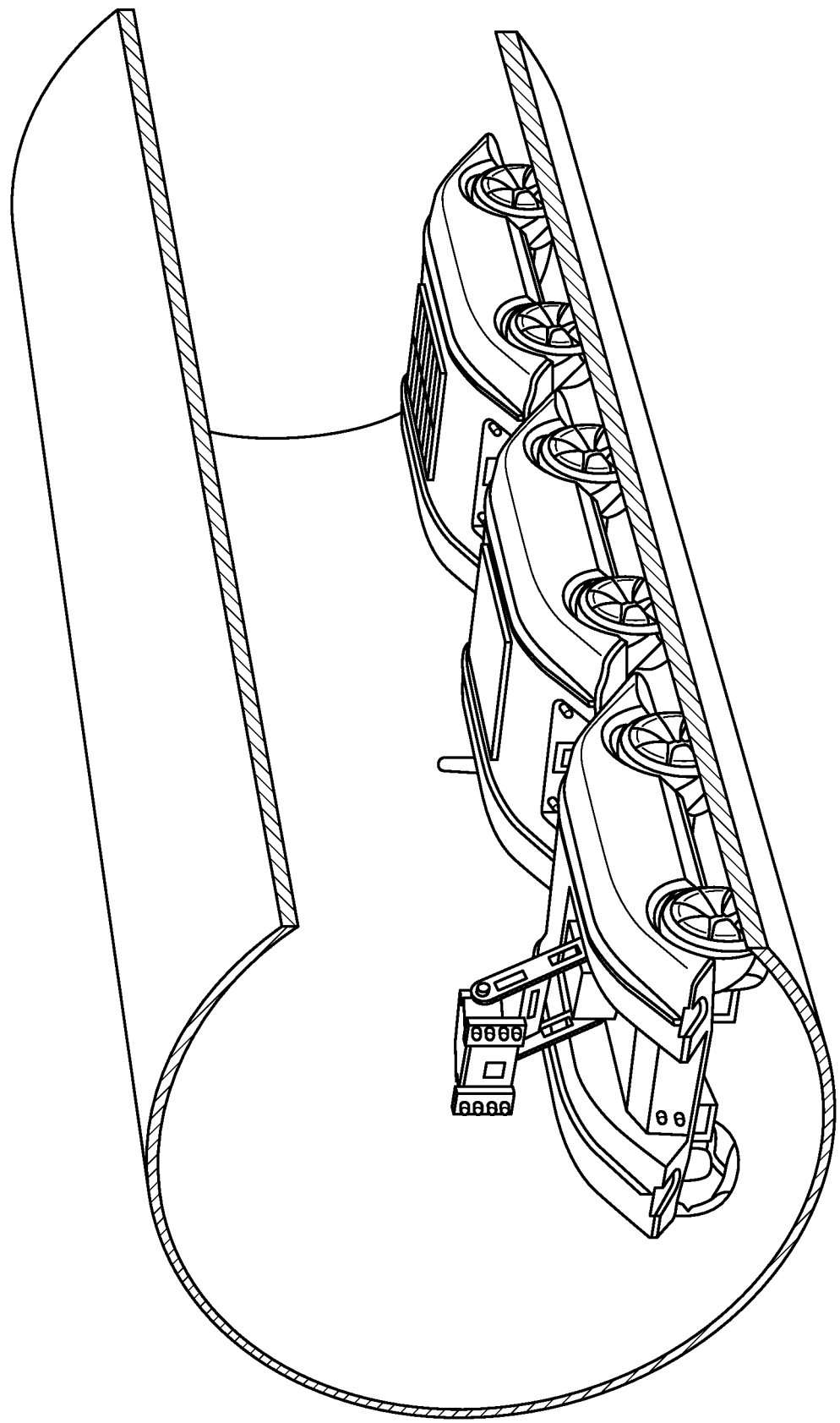
FIG. 13 is an illustration of a group of swarm robots inside a 12-inch pipe.
Figure 14:
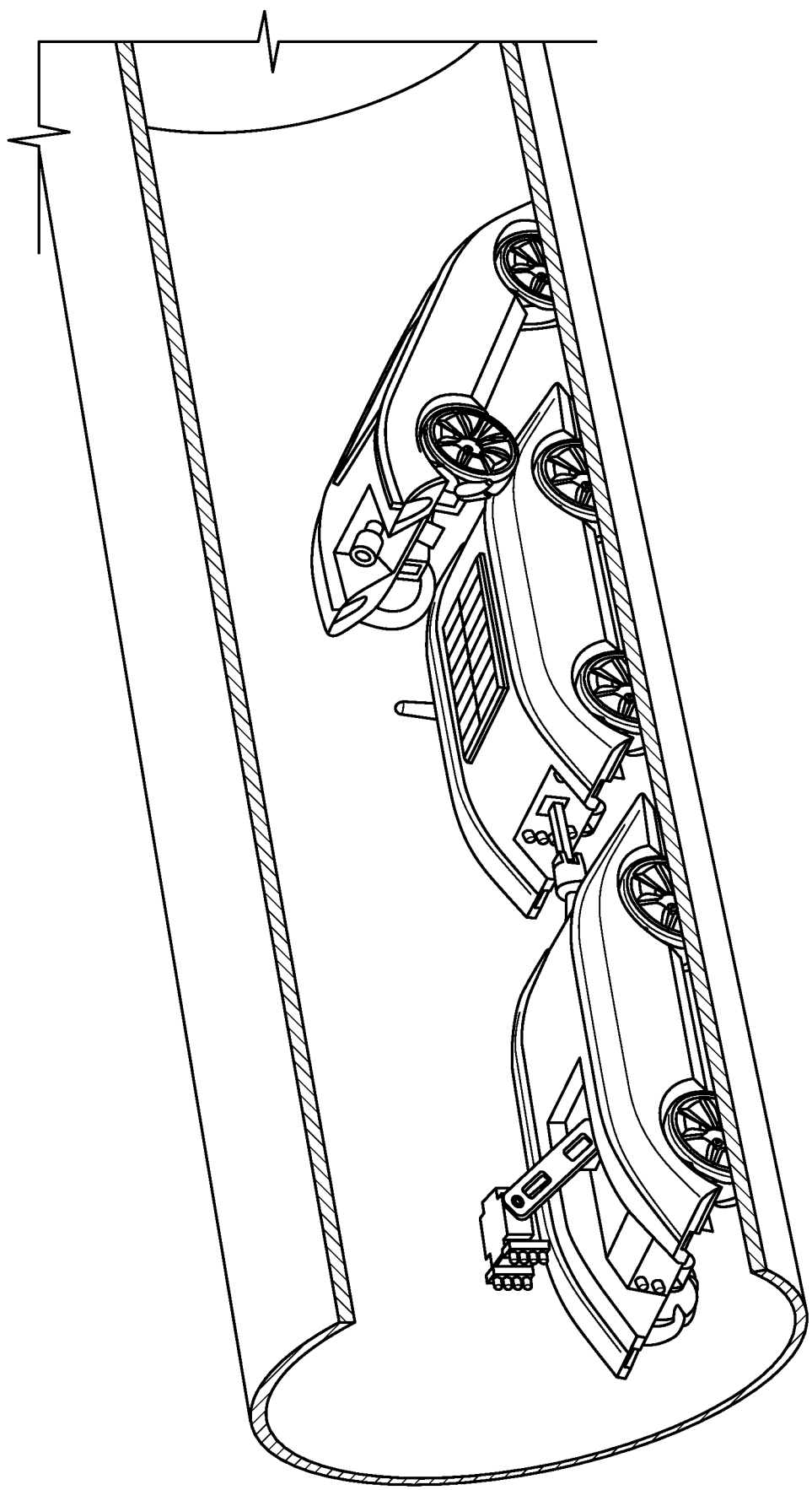
FIG. 14, is an illustration of swarm robots passing over each other inside a 12-inch pipe.
Figure 15:
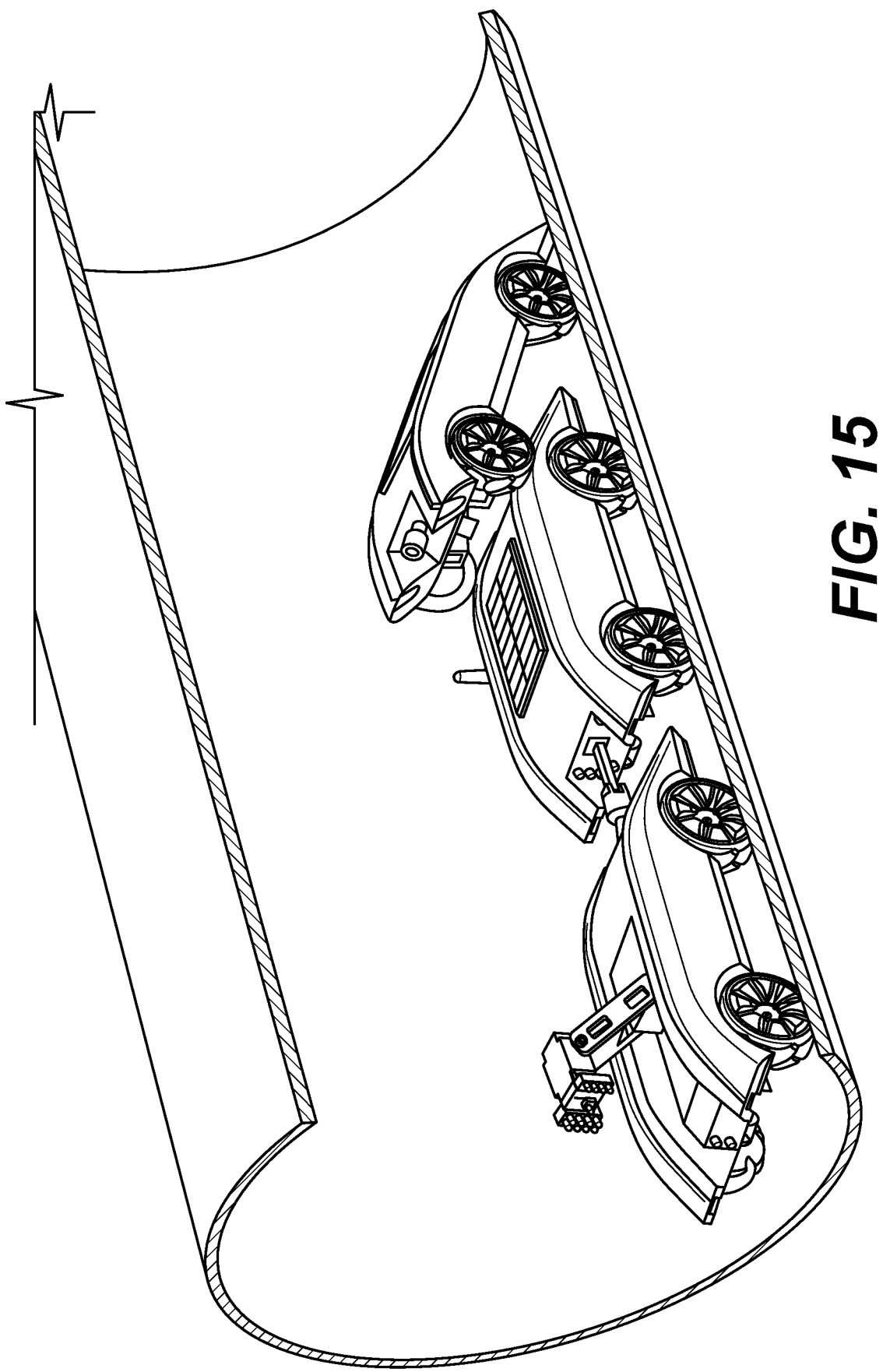
FIG. 15 is an illustration of swarm robots passing over one another inside a 16-inch pipe.
Figure 16:
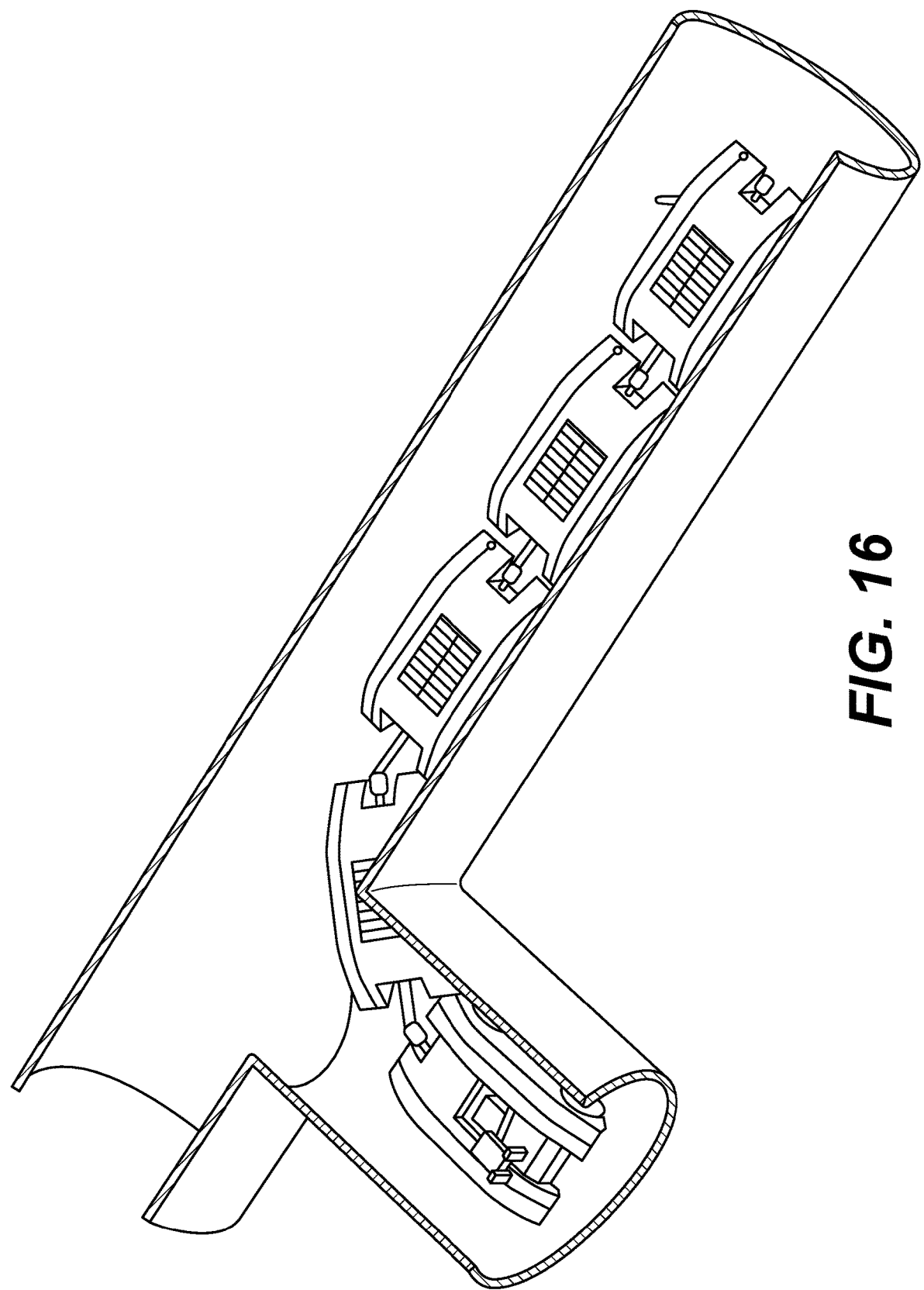
FIG. 16 is an illustration of 5 swarm robots in a trolley formation in a 16-inch pipe making a turn.
Figure 17:
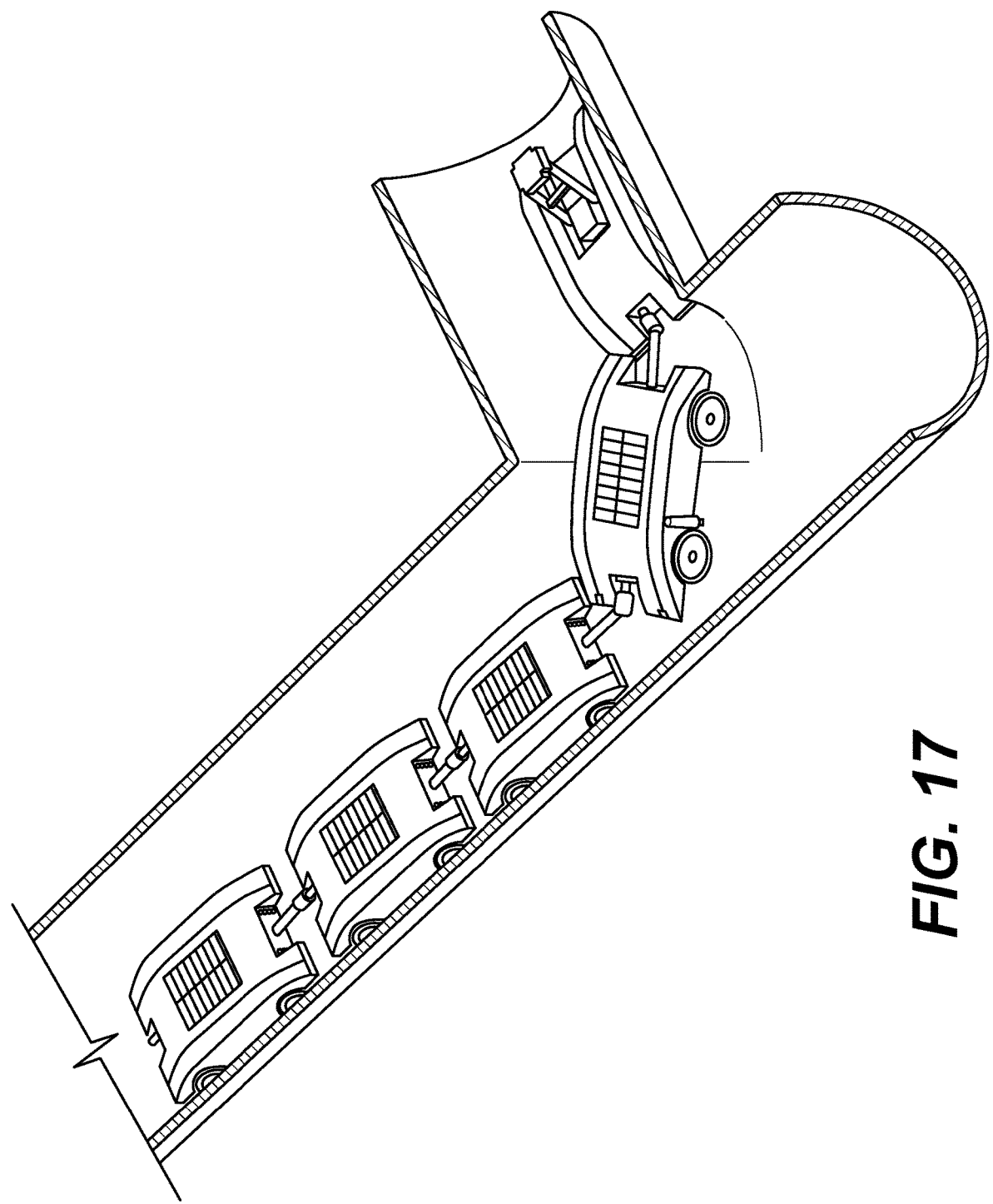
FIG. 17 is an illustration of 5 swarm robots in a trolley formation in a 16-inch pipe taking a turn.
Figure 18:
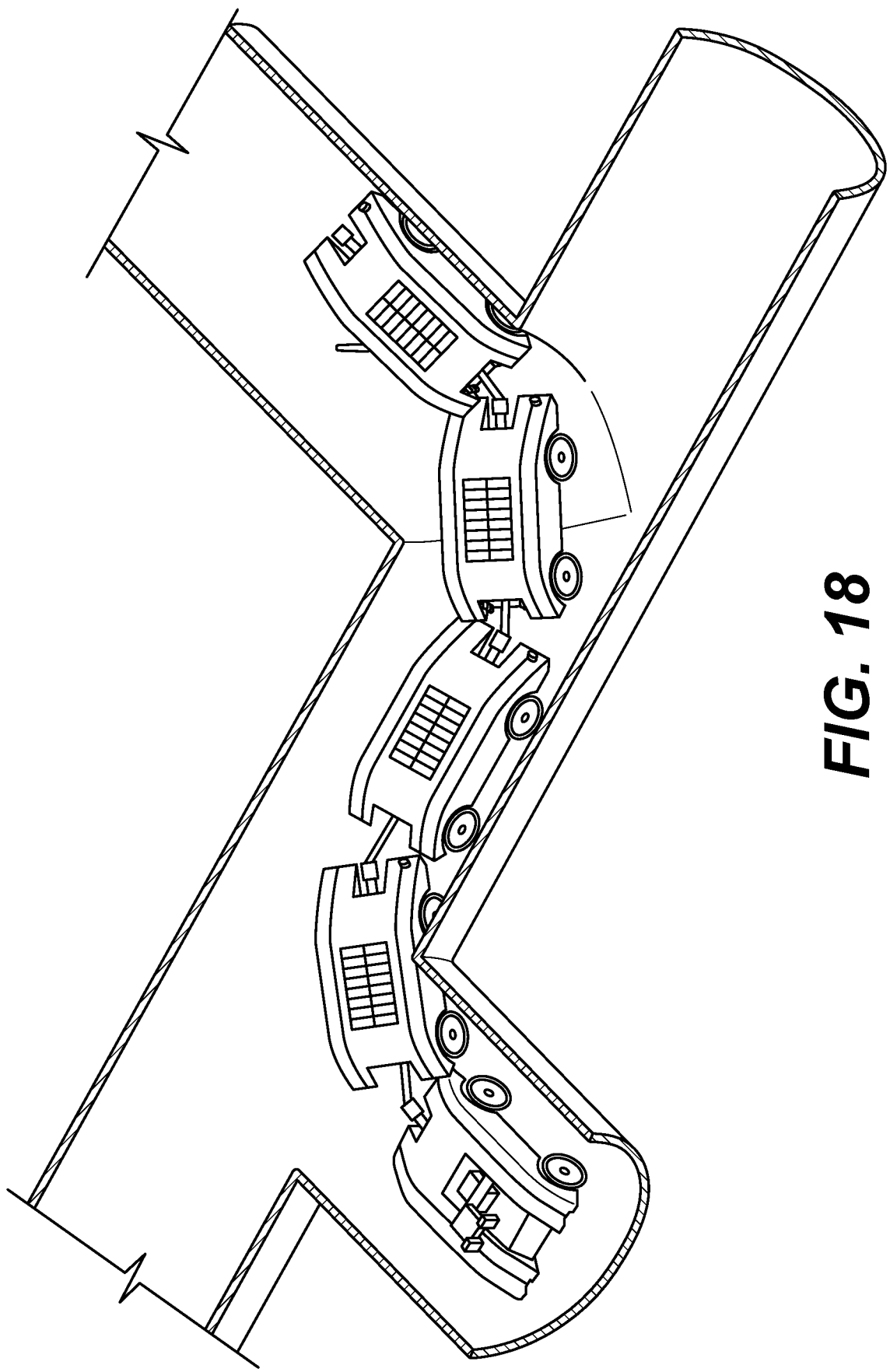
FIG. 18 is an illustration of 5 swarm robots in a trolley formation in a 16-inch pipe taking 2 turns.
Figure 19:
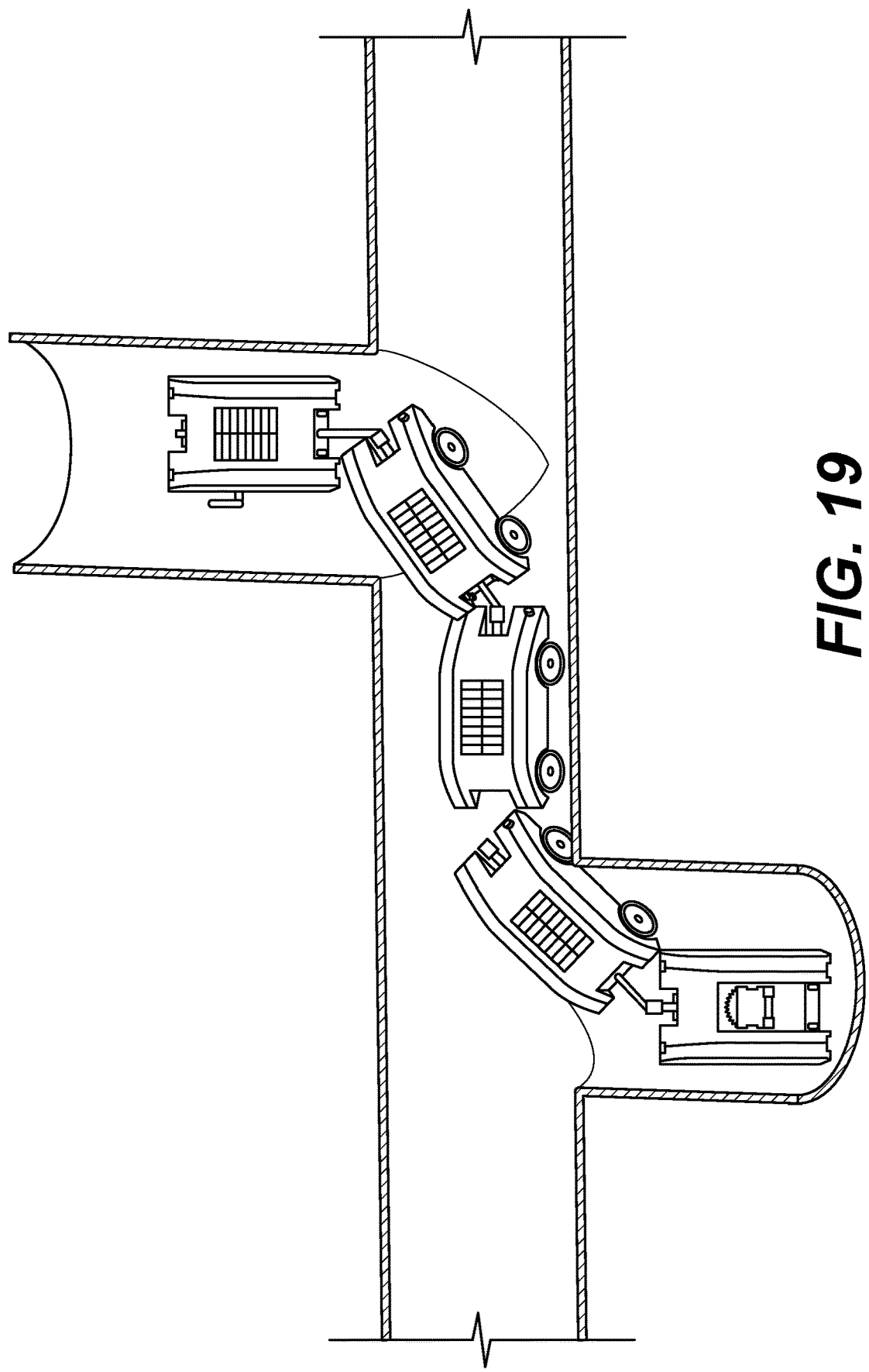
FIG. 19 is an illustration of 5 swarm robots in a trolley formation in a 16-inch pipe taking two turns.

Robot Dimensions: FIG. 6 is an illustration showing the dimensions of a robot. The robot has a length of 274 mm and width of 150 mm and a height of 82.5 mm. FIG. 7 is a robot side view. FIG. 8 is an illustration of three robots attached to each other. FIG. 9 is an illustration of a group of robots inside and 8-inch pipe. FIG. 10 is a cross sectional view of a robot in an 8-inch pipe. FIG. 11 is an illustration of a group of robots inside an 8-inch pipe. FIG. 12 is an illustration of robots passing over each other inside an 8-inch pipe. FIG. 13 is an illustration of a group of robots inside a 12-inch pipe. FIG. 14, is an illustration of robots passing over each other inside a 12-inch pipe. FIG. 15 is an illustration of robots passing over one another inside a 16-inch pipe. FIG. 16 is an illustration of 5 robots in a trolley formation in a 16-inch pipe making a turn. FIG. 17 is an illustration of 5 robots in a trolley formation in a 16-inch pipe taking a turn. FIG. 18 is an illustration of 5 robots in a trolley formation in a 16-inch pipe taking 2 turns. FIG. 19 is an illustration of 5 robots in a trolley formation in a 16-inch pipe taking two turns.

In addition, the following are some advantageous design features of the presently disclosed systems.

The present subject matter relates to a modular, comprehensive system comprised of multiple robots that operate independently or collaboratively to achieve the primary objective of inspecting and maintaining pipeline systems. The system can assess the condition of internal pipeline surfaces, including local damage inspection, corrosion detection, crack identification, and environmental monitoring. It can easily operate in potentially hazardous underground environments or confined spaces, access difficult-to-reach areas, and navigate complex piping networks, significantly reducing labor and operational costs.

All robots used in the present systems can share the same base design, while add-on, portable modules can determine the robot's functionality. This enables easy migration capability, allowing robots to exchange or introduce new functions as required.

Each robot in the present systems can feature a distinct role, functionality, and design. Based on functionality, there are six standard robot types.

1. Processing robots (the Brain), demonstrate higher processing capabilities than other robots that can handle complex artificial intelligence (AI) and machine learning (ML) applications. The robot is used to train new data when needed.

2. Network Communication robot performs various tasks related to network management, monitoring, and maintenance and is mainly responsible for internet communication.

3. PowerStation robot, functioning as a power station for the other robots in the system. The robot also has a regenerative motor or regenerative braking system.

4. Eye-Robot for Visual Inspection, this robot is equipped with high-definition AI cameras with night vision and underwater capabilities and advanced lighting systems to assess the overall condition, corrosion, cracks, and other anomalies. This robot also has a Leak Detection system based on Acoustic sensors. In addition, ultrasonic sensors for Pipe wall thickness measurement.

5. Ground-penetrating radar (GPR), GPR-equipped robots can generate detailed images of underground water pipes, including their depth, composition, and structural integrity. This robot will help build Maps of the general structures of the pipes and build a navigation plan for all the robot to cover larger area in an organized manner. This non-destructive testing method is beneficial for inspecting large-diameter pipes and identifying potential issues without excavation.

6. Printing Robot for Maintenance, this particular robot can be regarded as a mobile 3D printing device. It possesses the capacity to fabricate diminutive adhesive components designed to seal minor leaks. Upon detecting the dimensions of the fissure, the robot will generate a repair piece tailored to the specific size of the crack and apply it directly to the affected area.

In addition to the six standard robot types described, the present system can be equipped with any number of robots with custom functions (determined by the added portable module) and suited to specific applications, such as collecting and analyzing environmental samples, etc.

Depending on the requirements of any specific task, the present system could comprise any combination of robots in large or small groups or operate independently. Each robot is assigned a unique identifier, with the lowest ID being the leader. This permits, by way of non-limiting example, an innovative, customizable, and sustainable pipe inspection and maintenance system that can be used on pipeline systems of varying geometries, complexities, and environmental conditions. The robots are flexible allowing movement along any pipe structure due to the nature of TSRPIM. Further, the present systems are multi-use, as they can be used for inspecting and maintaining different pipelines under different environmental conditions, besides other tasks such as collecting and analyzing environmental samples.

The robots in the TSRPIM system, in one embodiment, can use SLAM algorithms (Simultaneous Localization and Mapping), which combine sensor data from multiple sources (e.g., cameras, LiDAR, IMUs, and GPS system) to simultaneously estimate the robot's position and create a map of the pipe's interior.

The robots in the present system, in an embodiment, can have the ability to have their batteries recharged wirelessly or by water energy when needed.

Further, in an embodiment, the robots in the TSRPIM system can be physically connected/disconnected with/from other robots through an electromagnetic system locking mechanism or any other locking mechanism known in the art. In this regard, robots in the TSRPIM system can be attached/detached from either or both sides (front/back). Further, the TSRPIM Robots have the option to bypass each other inside the pipe through overriding techniques.

The present systems can facilitate the management of inspections within intricate piping structures characterized by numerous bends, limited accessibility, and extensive distances. This can enhance the coverage of inspection areas in a reduced time frame, employing swarm search techniques to optimize the process. Further, the present systems can implement artificial intelligence to achieve an autonomous and learnable robotic system capable of making independent, rational decisions based on acquired experiences. Thus, the TSRPIM can promote the distribution of functionality and decentralization of intelligence within the system.

In an embodiment, the present system demonstrates an innovative approach that overcomes the limitations of existing technologies in terms of cost, operation time, and system complexity. In addition, the platform consists of autonomous, individual modules that can be operated independently or integrated with other modules to accomplish expansive missions. Further, the present system can be operated in autonomous and/or semi-manual modes. The system can be integrated with replaceable components or sub-systems that can be installed and disassembled without interfering with its functionality. As described herein, one or more robots in the present system can use 3D printing technology to manufacture system components that minimize the system weight.

Further, the present system can use advanced IoT connectivity for remote control and monitoring. In an embodiment, the system can be reliable, energy-efficient, and sustainable by using renewable technologies.

Since the present system uses robots only, it eliminates the need for human workers to enter potentially hazardous underground environments or confined spaces, reducing the risks associated with traditional inspection methods. This increased safety protects workers and mitigates liability concerns for organizations. Further, robotic underground water pipe inspections can be faster and more efficient than conventional methods. Robots can easily access hard-to-reach areas and navigate complex pipe networks, reducing labor and operational costs significantly.

In an embodiment, advanced sensors and cameras on the robots in the present systems can provide precise and reliable data on the condition of underground water pipes. This information helps organizations make informed decisions about maintenance and repairs, ultimately extending the life of the infrastructure and reducing water loss. Further, by detecting potential leaks and structural issues early, the robots can help prevent costly and environmentally damaging incidents like water contamination or waste. This proactive approach can allow organizations to maintain regulatory compliance and minimize environmental impact.

The present system represents a multipurpose system that can be used for inspection and maintenance of different pipelines under different environmental conditions, among other duties.

In an embodiment, the present system's complexity can be managed by employing a modular design approach and segregating the complex design and functions into stand-alone subsystems with specific functionality. The system structure can be simple to manufacture due to the independent modular design approach that divides the complex system into separate sub-systems that can be manufactured independently and assembled later. Further, the independent structural design can make the system upgradable and straightforward to maintain. Likewise, the system can be reconfigured to accommodate different requirements and site constraints regarding geometry and size.

It is to be understood that the system and method disclosed herein is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A pipe inspection swarm robot system having one or more swarm robots, each of the one or more swarm robots comprising:
   a main control and monitoring unit managing and controlling operations of the swarm robot;
   robot actuators and an actuator drive module providing required power to drive the robot actuators;
   a geared DC motor connected to wheels allowing the swarm robot to move in any direction and turn up to 360 degrees;
   an electromagnet locking mechanism allowing for physical connection to another swarm robot;
   obstacle avoidance sensors;
   a navigation system;
   a power supply and management module; and
   a function module allowing each of the one or more swarm robots to perform a specified task,
   wherein the specified task is fabricating a component to seal leaks through a 3D printing device using a 3D printing module of at least one of the one or more swarm robots.

2. The pipe inspection swarm robot system as recited in claim 1, wherein the function module is portable and is detachable from the swarm robot.

3. The pipe inspection swarm robot system as recited in claim 1, wherein the function module provides one or more of a processing function, a network communication function, a power station function, a visual inspection function, an imaging function, and a 3D printing function.

4. The pipe inspection swarm robot system as recited in claim 3, wherein the processing function comprises artificial intelligence (AI) and machine learning (ML) applications.

5. The pipe inspection swarm robot system as recited in claim 3, wherein the imaging function comprises ground penetrating radar generating detailed images of underground structures.

6. The pipe inspection swarm robot system as recited in claim 1, wherein the function module is customizable to perform a user defined function.

7. The pipe inspection swarm robot system as recited in claim 1, wherein the swarm robots are attachable to each other via the electromagnet locking mechanism.

8. The pipe inspection swarm robot system as recited in claim 1, wherein the swarm robots are detachable and attachable during use via the electromagnetic locking mechanism.

9. A method for pipe inspection using a swarm robot system having one or more swarm robots, each of the one or more swarm robots having: a main control and monitoring unit managing and controlling operations of the swarm robot; robot actuators and an actuator drive module providing required power to drive the robot actuators; a geared DC motor connected to wheels allowing the swarm robot to move in any direction and turn up to 360 degrees; an electromagnet locking mechanism allowing for physical connection to another swarm robot; obstacle avoidance sensors; a navigation system; a power supply and management module; and a function module allowing each of the one of the one or more swarm robots to perform a specified task, the method comprising:

receiving data from external sensors through a visual inspection module of the one or more swarm robots;

processing data received from the external sensors using artificial intelligence (AI) and machine learning (ML) applications through a processing module of the one or more swarm robots;

relaying the processed data to a user through at least one of the one or more swarm robots; and fabricating a component to seal leaks through a 3D printing device using a 3D printing module of at least one of the one or more swarm robots.

10. The method as recited in claim 9, further comprising supplying power to the one or more swarm robots through a power station module of at least one of the one or more swarm robots.

11. The method as recited in claim 9, further comprising generating detailed images of underground structures through an imaging module of at least one of the one or more swarm robots.

* * * * *